(12) United States Patent
Waatti et al.

(10) Patent No.: US 12,420,473 B2
(45) Date of Patent: Sep. 23, 2025

(54) TACK AND DRAG PRINTING

(71) Applicant: NIKE, Inc., Beaverton, OR (US)

(72) Inventors: Todd A. Waatti, Battleground, WA (US); Yoav Sterman, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 597 days.

(21) Appl. No.: 17/839,083

(22) Filed: Jun. 13, 2022

(65) Prior Publication Data

US 2022/0305721 A1    Sep. 29, 2022

Related U.S. Application Data

(60) Continuation of application No. 16/894,685, filed on Jun. 5, 2020, now Pat. No. 11,364,676, which is a continuation of application No. 15/882,901, filed on Jan. 29, 2018, now Pat. No. 10,675,809, which is a division of application No. 14/935,731, filed on Nov. 9, 2015, now Pat. No. 9,889,606.

(51) Int. Cl.
| | |
|---|---|
| *B29C 64/118* | (2017.01) |
| *B29C 65/00* | (2006.01) |
| *B33Y 10/00* | (2015.01) |
| *B33Y 30/00* | (2015.01) |
| *B33Y 50/02* | (2015.01) |

(52) U.S. Cl.
CPC .......... *B29C 64/118* (2017.08); *B29C 65/002* (2013.01); *B33Y 10/00* (2014.12); *B33Y 30/00* (2014.12); *B33Y 50/02* (2014.12)

(58) Field of Classification Search
CPC ... B29C 64/118; B29C 65/002; B29C 64/106; B29C 64/141; B29C 64/20; B33Y 10/00; B33Y 30/00; B33Y 50/02
See application file for complete search history.

(56) References Cited

U.S. PATENT DOCUMENTS

| | | | |
|---|---|---|---|
| 4,707,893 A | 11/1987 | Hashizume et al. | |
| 5,121,329 A * | 6/1992 | Crump | B33Y 30/00 228/180.5 |
| 6,083,556 A | 7/2000 | Hennen | |

(Continued)

FOREIGN PATENT DOCUMENTS

| | | |
|---|---|---|
| CN | 101223094 A | 7/2008 |
| CN | 203004330 U | 6/2013 |

(Continued)

OTHER PUBLICATIONS

International Search Report and Written Opinion, issued Jan. 2, 2017, for corresponding International Patent Application No. PCT/US2016/052896, 10 pages.

(Continued)

*Primary Examiner* — Michael N Orlando
(74) *Attorney, Agent, or Firm* — Klarquist Sparkman, LLP

(57) ABSTRACT

A method and apparatus for bonding a yarn to a wearable article includes bonding the yarn to the wearable article at a first portion and a second portion. A first bonding location and a second bonding location are spaced apart from one another on a surface of the wearable article and an intermediate portion of the yarn extends contiguously between the first bonding location and the second bonding location and is not bonded to the wearable article.

20 Claims, 22 Drawing Sheets

(56) References Cited

U.S. PATENT DOCUMENTS

| | | | |
|---|---|---|---|
| 6,153,034 A | 11/2000 | Lipsker | |
| 6,692,606 B1 | 2/2004 | Cederblad et al. | |
| 6,824,717 B2 | 11/2004 | Schafer | |
| 8,578,996 B2 | 11/2013 | Lee | |
| 2004/0103979 A1 | 6/2004 | Kramer | |
| 2005/0280184 A1 | 12/2005 | Sayers et al. | |
| 2012/0096688 A1 | 4/2012 | Cheng | |
| 2014/0020192 A1 | 1/2014 | Jones et al. | |
| 2014/0061974 A1* | 3/2014 | Tyler | B29C 64/118 264/401 |
| 2014/0096414 A1 | 4/2014 | Koo et al. | |
| 2015/0290875 A1 | 10/2015 | Mark et al. | |
| 2015/0314531 A1* | 11/2015 | Mark | B29C 64/209 264/241 |

FOREIGN PATENT DOCUMENTS

| | | |
|---|---|---|
| CN | 104149339 A | 11/2014 |
| CN | 104302465 A | 1/2015 |
| CN | 204604934 U | 9/2015 |
| DE | 102005030906 | 1/1972 |
| DE | 2212802 | 10/1972 |
| TW | M498111 | 4/2015 |

OTHER PUBLICATIONS

Taiwanese Office Action, issued Aug. 23, 2017, for corresponding Taiwan Patent Application No. 105136186, 16 pages (with English translation).

\* cited by examiner

TACK AND DRAG PRINTING

CROSS REFERENCE TO RELATED APPLICATIONS

This application is a continuation of U.S. patent application Ser. No. 16/894,685, filed Jun. 5, 2020, which is a continuation of U.S. patent application Ser. No. 15/882,901, filed Jan. 29, 2018, now U.S. Pat. No. 10,675,809, which is a divisional of U.S. patent application Ser. No. 14/935,731, filed Nov. 9, 2015, now U.S. Pat. No. 9,889,606. The prior applications are incorporated herein by reference in their entirety.

BACKGROUND

The present embodiments relate generally to three-dimensional printing systems and methods.

Three-dimensional printing systems and methods may be associated with various technologies including fused deposition modeling (FDM), electron beam freeform fabrication (EBF), selective laser sintering (SLS) as well as other kinds of three-dimensional printing technologies.

Structures formed from three-dimensional printing systems can be used with objects formed by other manufacturing techniques. These include textile materials used in various articles of footwear and/or articles of apparel.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
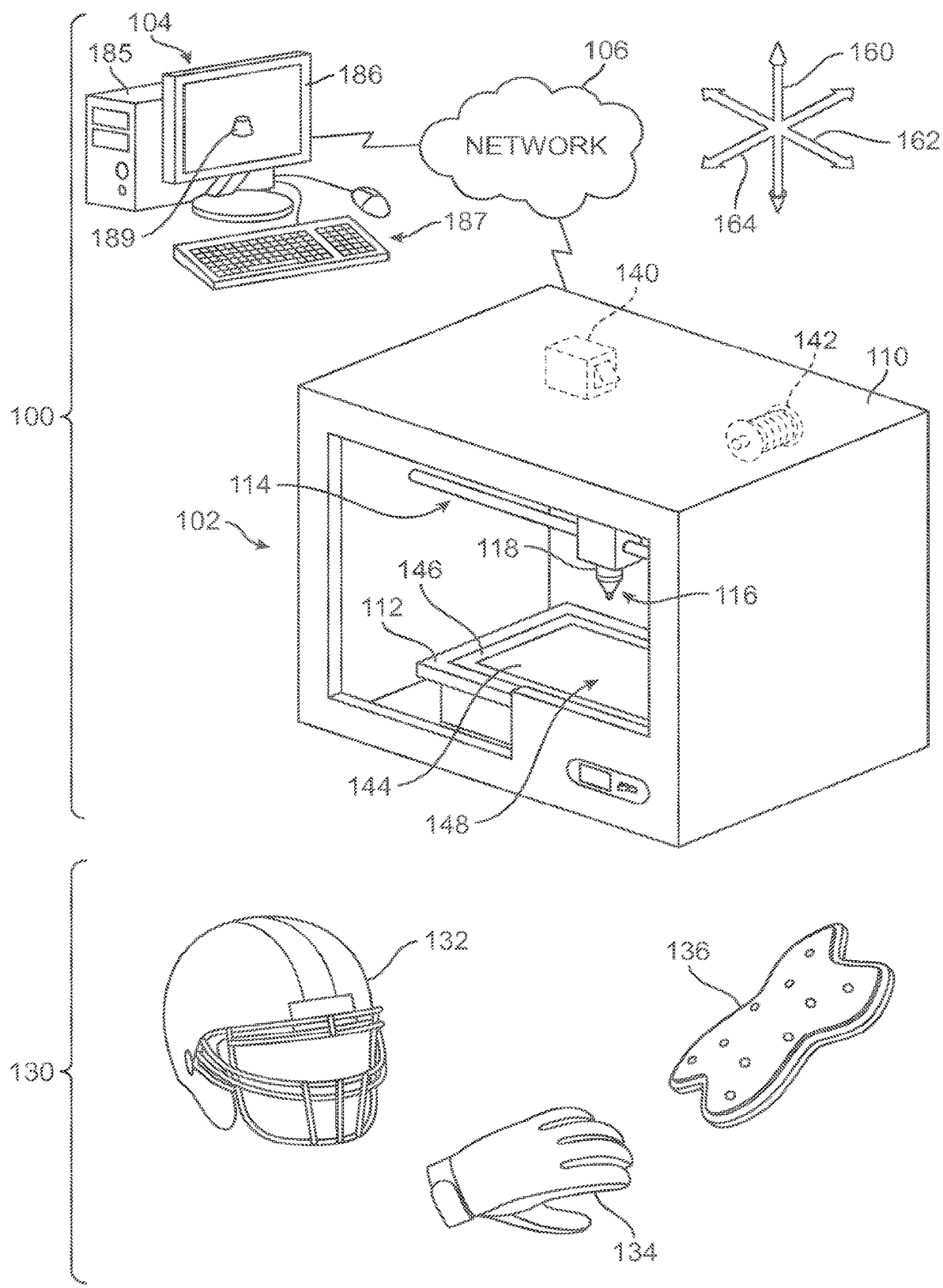
FIG. 1 is a is a schematic view of an embodiment of components of a three-dimensional printing system as well as several articles that may be used with the three-dimensional printing system.

In one aspect, a method of printing onto a base includes providing a yarn from a material source disposed in a printing system. The yarn is an elongated continuous piece including a tagging segment and a reel segment. The reel segment is disposed proximate the material source. The tagging segment extends from a nozzle of the printing system. The method further includes attaching the tagging segment to the base and moving the nozzle away from the tagging segment after the attaching the tagging segment to the base. The nozzle is moved by an actuating system of the printing system. The moving the nozzle along the base increases a tension between the tagging segment and the material source. The tension in the yarn pulls the reel segment from the material source.

In another aspect, a method of printing onto a base includes providing a yarn from a material source within a printing system. The yarn is an elongated continuous piece including a tagging segment and an intermediate segment. The method further includes feeding the tagging segment of the yarn through a nozzle having an inflow opening and an outflow opening. The tagging segment extends out of the nozzle from the outflow opening. The intermediate segment extends out of the nozzle from the inflow opening. The method further includes attaching the tagging segment to a first attachment region of the base. Additionally, the method includes moving the nozzle away from the first attachment region after the attaching the tagging segment to the first attachment region, thereby pulling the intermediate segment from the outflow opening. The nozzle is moved by an actuating system of the printing system.

In another aspect, an apparatus for printing onto a base includes a material source, a nozzle, and an actuating system. The material source is configured to supply a yarn. The yarn is an elongated continuous piece including a tagging segment, an intermediate segment, and a reel segment. The reel segment is disposed proximate the material source. The intermediate segment is disposed between the tagging segment and the reel segment. The nozzle is configured to receive the yarn at an inflow opening and to provide the yarn from an outflow opening. The tagging segment extends from the outflow opening. The intermediate segment extends from the inflow opening. The actuating system is configured to move the outflow opening into the base. The apparatus is configured for a first state and a second state. The tagging segment extends from the outflow opening during the first state. The tagging segment is unsecured during the first state. The nozzle moves without applying tension to the yarn during the first state. The tagging segment extends from the outflow opening during the second state. The tagging segment is secured to the base during the second state. The nozzle applies tension to the yarn during the second state.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

FIG. 1 is a schematic view of an embodiment of a three-dimensional printing system 100, also referred to simply as printing system 100 hereafter. FIG. 1 also illustrates several exemplary articles 130 that may be used with printing system 100. Referring to FIG. 1, printing system 100 may further comprise printing device 102, computing system 104, and network 106.

Embodiments may use various kinds of three-dimensional printing (or additive manufacturing) techniques. Three-dimensional printing, or "3D printing", comprises various technologies that are used to form three-dimensional objects by depositing successive layers of material on top of one another. Exemplary 3D printing technologies that could be used include, but are not limited to: fused filament fabrication (FFF), electron beam freeform fabrication (EBF), direct metal laser sintering (DMLS), electron beam melting (EMB), selective laser melting (SLM), selective heat sintering (SHS), selective laser sintering (SLS), plaster-based 3D printing (PP), laminated object manufacturing (LOM), stereolithography (SLA), digital light processing (DLP) as well as various other kinds of 3D printing or additive manufacturing technologies known in the art.

In the embodiments shown in the figures, printing system 100 may be associated with fused filament fabrication (FFF), also referred to as fused deposition modeling. In the embodiment shown in FIG. 1, printing device 102 of printing system 100 uses fused filament fabrication to produce three-dimensional parts. An example of a printing device using fused filament fabrication (FFF) is disclosed in Crump, U.S. Pat. No. 5,121,329, issued on Jun. 9, 1992, titled "Apparatus and Method for Creating Three-Dimensional Objects," which application is herein incorporated by reference and referred to hereafter as the "3D Objects" application. Embodiments of the present disclosure may make use of one or more of the systems, components, devices and methods disclosed in the 3D Objects application.

Printing device 102 may include housing 110 that supports various systems, devices, components or other provisions that facilitate the three-dimensional printing of objects (e.g., parts, components, structures, etc.). Although the exemplary embodiment depicts a particular rectangular box-like geometry for housing 110, other embodiments could use any housing having any geometry and/or design. The shape and size of the housing of a printing device could be varied according to factors including a desired foot-print for the device, the size and shape of parts that may be formed within the printing device as well as possibly other factors. It will be understood that the housing of a printing device could be open (e.g., provide a frame with large openings) or closed (e.g., with glass or panels of solid material and a door).

In some embodiments, printing device 102 may include provisions to retain or hold a printed object (or a component supporting the printed object). In some embodiments, printing device 102 may include a table, platform, tray or similar component to support, retain and/or hold a printed object or an object onto which printed material is being applied. In the embodiment of FIG. 1, printing device 102 includes tray 112. In some embodiments, tray 112 may be fixed in place. In other embodiments, however, tray 112 could move. For example, in some cases, tray 112 may be configured to translate within housing 110 in a horizontal direction (e.g., front-back and/or left right with respect to housing 110) as well as a vertical direction (e.g., up-down within housing 110). Moreover, in some cases, tray 112 may be configured to rotate and/or tilt about one or more axes associated with tray 112. Thus it is contemplated that in at least some embodiments, tray 112 may be moved into any desired relative configuration with a nozzle or print head of printing device 102.

In some embodiments, printing device 102 may include one or more systems, devices, assemblies or components for delivering a printed material (or printed substance) to a target location. Target locations could include the surface of tray 112, a surface or portion of a partially printed structure and/or a surface or portion of a non-printed structure or component. Provisions for delivering printed materials include, for example, print heads and nozzles. In the embodiment of FIG. 1, printing device 102 includes nozzle assembly 116.

Nozzle assembly 116 may comprise one or more nozzles that deliver a printed material to a target location. For purposes of clarity, the exemplary embodiment of FIG. 1 depicts a single nozzle 118 of nozzle assembly 116. However, in other embodiments, nozzle assembly 116 could be configured with any number of nozzles, which could be arranged in an array or any particular configuration. In embodiments including two or more nozzles, the nozzles could be configured to move together and/or independently. For example, in an embodiment of a printing system discussed below, a printing device could be configured with at least two nozzles that can move in an independent manner from one another.

Nozzle 118 may be configured with a nozzle aperture that can be opened and/or closed to control the flow of material exiting from nozzle 118. Specifically, the nozzle aperture may be in fluid communication with a nozzle channel that receives a supply of material from material source 142 within printing device 102. For example, the supply of material may be a yarn composition. In some embodiments, the supply of material may include a heat moldable material and a melt resistant material. In at least some embodiments, the supply of material (e.g., heat moldable and/or melt resistant material) may be provided as a coil, which may then be unwound and fed through nozzle 118 to be deposited at a target location. In some embodiments, a worm-drive may be used to push the supply of material into nozzle 118 at a specific rate (which may be varied to achieve a desired volumetric flow rate of material from nozzle 118). In other embodiments, a worm-drive is omitted. For example, the supply of material may be dispensed from the nozzle using an actuating system. It will be understood that in some cases, the supply of material could be provided at a location near nozzle 118 (e.g., in a portion of nozzle assembly 116), while in other embodiments the supply of material could be located at some other location of printing device 102 and fed via tubes, conduits, or other provisions, to nozzle assembly 116.

The heating system may be configured to provide any temperature to a yarn. For example, in various embodiments, heating system 140 provides a temperature within a particular temperature range. For example, heating system 140 may provide a temperature of more than 500° C. In another example, heating system 140 may provide a temperature of more than 300° C. In a further example, heating system 140 may provide a temperature of more than 230° C. In one example, heating system 140 may provide a temperature of between 110° C. and 200° C.

In some embodiments, nozzle assembly 116 is associated with actuating system 114. Actuating system 114 may include various components, devices and systems that facilitate the motion of nozzle assembly 116 within housing 110. In particular, actuating system 114 may include provisions to move nozzle assembly 116 in any horizontal direction and/or vertical direction to facilitate depositing a material so as to form a three-dimensional object. To this end, embodiments of actuating system 114 may include one or more tracks, rails, and/or similar provisions to hold nozzle assembly 116 at various positions and/or orientations within housing 110. Embodiments may also include any kinds of motors, such as a stepper motor or a servo motor, to move nozzle assembly 116 along a track or rail, and/or to move one or more tracks or rails relative to one another.

In some embodiments, the heating system could be stationary. As shown in FIG. 1, heating system 140 may be attached to the housing 110. In other embodiments, the heating system could be moved along with the nozzle. For example, heating system 140 may be moved relative to the housing 110 by actuating system 114 or another actuating system (not shown). That is, in some cases, the heating system may be integrated into, or attached adjacent to, the print head. For example, heating system 140 may be integrated to nozzle assembly 116. For purposes of illustration, heating system 140 is shown as being separate from nozzle assembly 116 in FIGS. 1-18.

In some instances, it may be desirable to move the nozzle with other components of the printing device. In some embodiments, the actuating system may include various components, devices and systems that facilitate the motion of a heating system within the housing. For example, actuating system 114 may include various components, devices and systems that facilitate the motion of heating system 140 within housing 110 (not shown). Similarly, in certain embodiments, the actuating system may include various components, devices and systems that facilitate the motion of material source within the housing. For example, actuating system 114 may include various components, devices and systems that facilitate the motion of material source 142 within housing 110 (not shown). Moreover, in various embodiments, the actuating system is configured to move the nozzle assembly with the heating system and/or the material source. For example, actuating system 114 is configured to move nozzle assembly 116 together with heating system 140 and/or material source 142. In other embodiments, the actuating system is configured to move the nozzle assembly independently to the heating system and/or the material source. For example, actuating system 114 is configured to move nozzle assembly 116 independently from heating system 140 by use of different tracks, rails, and/or similar provisions. Similarly, in another example, actuating system 114 is configured to move nozzle assembly 116 independently from material source 142. In other embodiments, the table is moved and a position of the nozzle assembly, heating system, and material source is maintained. For example, tray 112 is moved and a position of the nozzle assembly 116, heating system 140, and material source 142 is maintained.

An actuating system can be configured to move a nozzle in one or more directions. In some embodiments, an actuating system could move a nozzle in a single linear direction. In other embodiments, an actuating system could move a nozzle in at least two perpendicular directions. In still other embodiments, an actuating system could move a nozzle in three perpendicular directions or along three perpendicular axes of the system. For example, in the exemplary embodiment shown in FIG. 1, actuating system 114 may be configured to move nozzle 118 along first axis 160, second axis 162, and third axis 164. As seen in FIG. 1, first axis 160 may be associated with a vertical direction of housing 110, while second axis 162 and third axis 164 may be associated with horizontal directions of housing 110 (e.g., length and width directions). Of course while the exemplary embodiment depicts an actuating system capable of moving a nozzle through three independent x-y-z or Cartesian directions, other embodiments may be configured to move a nozzle in three independent directions associated with a non-Cartesian coordinate system (e.g., a spherical coordinate system, a cylindrical coordinate system, etc.). Still further, in other cases an actuating system could move a nozzle through three different directions that may not be orthogonal (e.g., directions of an oblique coordinate system).

In certain embodiments, first axis 160 is approximately normal to a printing surface, such as print surface 148 of base 144. As used herein, a direction is approximately normal to a surface when it is within 10 degrees from perpendicular to the surface. For example, as shown, first axis 160 is approximately normal to print surface 148. In other embodiments, the first axis may be aligned differently with the printing surface.

In those instances where the actuating system is configured to move the nozzle in two or more perpendicular directions, the actuating system may permit the nozzle to simultaneously move in any suitable number of the perpendicular directions. In some embodiments, the actuating system may simultaneously move the nozzle in two or more of the perpendicular directions. For example, actuating system 114 may move nozzle 118 in a direction parallel to first axis 160 while simultaneously moving nozzle 118 in a direction parallel to second axis 162 and/or in a direction parallel to third axis 164. In some embodiments, a position at an axis may be maintained or held at a particular position while the actuating system moves the nozzle in a direction parallel to another axis. For example, actuating system 114 may maintain nozzle 118 at a position of first axis 160 while moving nozzle 118 in a direction parallel to second axis 162 and/or while moving nozzle 118 in a direction parallel to third axis 164. In another example, actuating system 114 may lower or elevate nozzle 118 in a direction parallel to first axis 160 while maintaining a base position of nozzle 118 in second axis 162 and/or maintaining a base position of nozzle 118 in third axis 164. In other embodiments, the actuating system may move the nozzle along one of the perpendicular directions at a time.

It will be understood that for purposes of illustration, the components, devices and systems of printing device 102 are shown schematically in FIG. 1. It will therefore be appreciated that embodiments may include additional provisions not shown, including specific parts, components and devices that facilitate the operation of actuating system 114 and nozzle assembly 116. For example, actuating system 114 is shown schematically as including several tracks or rails, but the particular configuration and number of parts including actuating system 114 may vary from one embodiment to another.

In different embodiments, printing device 102 may use a variety of different materials for forming 3D parts, including, but not limited to: thermoplastics (e.g., polyactic acid and acrylonitrile butadiene styrene), high density polyethylene, eutectic metals, rubber, clays (including metal clays), Room Temperature Vulcanizing silicone (RTV silicone), porcelain, as well as possibly other kinds of materials known in the art. In embodiments where two or more different printed or extruded materials are used to form a part, any two or more of the materials disclosed above could be used.

As discussed above, printing system 100 can include provisions to control and/or receive information from printing device 102. These provisions can include computing system 104 and network 106. Generally, the term "computing system" refers to the computing resources of a single computer, a portion of the computing resources of a single computer, and/or two or more computers in communication with one another. Any of these resources can be operated by one or more human users. In some embodiments, computing system 104 may include one or more servers. In some cases, a print server may be primarily responsible for controlling and/or communicating with printing device 102, while a separate computer (e.g., desktop, laptop or tablet) may facilitate interactions with a user. Computing system 104 can also include one or more storage devices including but not limited to magnetic, optical, magneto-optical, and/or memory, including volatile memory and non-volatile memory.

In the exemplary embodiment of FIG. 1, computing system 104 may comprise a central processing device 185, viewing interface 186 (e.g., a monitor or screen), input devices 187 (e.g., keyboard and mouse), and software for designing a computer-aided design ("CAD") representation 189 of a printed structure. In at least some embodiments, the CAD representation 189 of a printed structure may include not only information about the geometry of the structure, but also information related to the materials required to print various portions of the structure.

In some embodiments, computing system 104 may be in direct contact with printing device 102 via network 106. Network 106 may include any wired or wireless provisions that facilitate the exchange of information between computing system 104 and printing device 102. In some embodiments, network 106 may further include various components such as network interface controllers, repeaters, hubs, bridges, switches, routers, modems and firewalls. In some cases, network 106 may be a wireless network that facilitates wireless communication between two or more systems, devices and/or components of printing system 100. Examples of wireless networks include, but are not limited to: wireless personal area networks (including, for example, Bluetooth), wireless local area networks (including networks utilizing the IEEE 802.11 WLAN standards), wireless mesh networks, mobile device networks as well as other kinds of wireless networks. In other cases, network 106 could be a wired network including networks whose signals are facilitated by twister pair wires, coaxial cables, and optical fibers. In still other cases, a combination of wired and wireless networks and/or connections could be used.

In some embodiments, printed structures may be printed directly to one or more articles. The term "articles" is intended to include both articles of footwear (e.g., shoes) and articles of apparel (e.g., shirts, pants, etc.). As used throughout this disclosure, the terms "article of footwear" and "footwear" include any footwear and any materials associated with footwear, including an upper, and may also be applied to a variety of athletic footwear types, including baseball shoes, basketball shoes, cross-training shoes, cycling shoes, football shoes, tennis shoes, soccer shoes, and hiking boots, for example. As used throughout this disclosure, the terms "article of footwear" and "footwear" also include footwear types that are generally considered to be nonathletic, formal, or decorative, including dress shoes, loafers, sandals, slippers, boat shoes, and work boots.

While the disclosed embodiments are described in the context of footwear, the disclosed embodiments may further be equally applied to any article of clothing, apparel, or equipment that includes 3D printing. For example, the disclosed embodiments may be applied to hats, caps, shirts, jerseys, jackets, socks, shorts, pants, undergarments, athletic support garments, gloves, wrist/arm bands, sleeves, headbands, any knit material, any woven material, any nonwoven material, sports equipment, etc. Thus, as used throughout this disclosure, the term "article of apparel" may refer to any apparel or clothing, including any article of footwear, as well as hats, caps, shirts, jerseys, jackets, socks, shorts, pants, undergarments, athletic support garments, gloves, wrist/arm bands, sleeves, headbands, any knit material, any woven material, any nonwoven material, etc.

In an exemplary embodiment, printing device 102 may be configured to print one or more structures directly onto a portion of one of articles 130. Articles 130 comprise exemplary articles that may receive a printed structure directly from printing device 102, including a helmet 132, which includes a three-dimensional configuration, as well as a glove 134, which includes both a three-dimensional configuration (e.g., top) and a flattened configuration (e.g., side). Articles 130 also include a shin guard 136, which includes a flattened configuration (e.g., front). Thus it will be understood that printing device 102 may be used to apply printed material to articles in three-dimensional configurations and/or flattened configurations.

In order to apply printed materials directly to one or more articles, printing device 102 may be capable of printing onto the surfaces of various kinds of materials. Specifically, in some cases, printing device 102 may be capable of printing onto the surfaces of various materials such as a textile, a natural fabric, a synthetic fabric, a knit, a woven material, a nonwoven material, a mesh, a leather, a synthetic leather, a polymer, a rubber, and a foam, or any combination of them, without the need for a release layer interposed between a substrate and the bottom of the printed material, and without the need for a perfectly or near-perfectly flat substrate surface on which to print. For example, the disclosed methods may include printing a resin, acrylic, thermoplastic material or ink material onto a fabric, for example a knit material, where the material is adhered/bonded to the fabric and where the material does not generally delaminate when flexed, rolled, worked, or subject to additional assembly processes/steps. As used throughout this disclosure, the term "fabric" may be used to refer generally to materials chosen from any textile, natural fabric, synthetic fabric, knit, woven material, nonwoven material, mesh, leather, synthetic leather, polymers, rubbers, and foam.

Although some embodiments may use printing device 102 to print structures directly onto the surface of a material, other embodiments may include steps of printing a structure onto a tray or release paper, and then joining the printed structure to an article in a separate step. In other words, in at least some embodiments, printed structures need not be printed directly to the surface of an article.

Printing system 100 may be operated as follows to provide one or more structures that have been formed using a 3D printing, or additive, process. Computing system 104 may be used to design a structure. This may be accomplished using some type of CAD software, or other kind of software. The design may then be transformed into information that can be interpreted by printing device 102 (or a related print server in communication with printing device 102). In some cases, the design may be converted to a 3D printable file, such as a stereolithography file (STL file).

Before printing, an article may be placed onto tray 112. Once the printing process is initiated (by a user, for example), printing device 102 may begin depositing material onto the article. This may be accomplished by moving nozzle 118 (using actuating system 114) to build up layers of a structure using deposited material. In embodiments where fused filament fabrication is used, material extruded from nozzle 118 may be heated so as to increase the pliability of the heat moldable material as it is deposited.

In some instances it is desirable to include an elastic layer to prevent the tray 112 from impacting the nozzle 118. As shown in FIG. 1, elastic layer 146 may be placed on tray 112 to separate tray 112 from base 144. In other embodiments, the elastic layer may be omitted.

In those instances where an elastic layer is used, the elastic layer may have any suitable shape. Examples of a shape of an elastic layer include rectangular, circular, triangular, and shaped like an upper for an article of footwear. In some embodiments, the elastic layer may have a shape corresponding with the base. As shown in FIG. 1, elastic layer 146 may have a rectangular shape corresponding with a rectangular shape of base 144. In other embodiments, the elastic layer and the base may have different shapes.

In those instances where an elastic layer is used, the elastic layer may be formed of any suitable material. In some embodiments, the elastic layer may be formed of an elastic material to prevent an impact between the tray and the nozzle. Examples of elastic material may include natural and/or synthetic rubber, nylon, polystyrene, polytetrafluoroethylene (TEFLON), and polyethylene. In other embodiments, the elastic layer may be formed of inelastic materials.

In those instances where an elastic layer is used, the elastic layer may be positioned in any suitable manner with the base. In some embodiments, the base may directly contact the elastic layer. As shown in FIG. 1, base 144 may directly contact elastic layer 146. In other embodiments, another layer may separate the base and the elastic layer (not shown).

Although some of the embodiments shown in the figures depict a system using filament fused fabrication printing technologies, it will be understood that still other embodiments could incorporate one or more different 3D printing technologies. Moreover, embodiments could incorporate a combination of filament fused fabrication and another type of 3D printing technique to achieve desired results for a particular printed structure or part.

Figure 2:
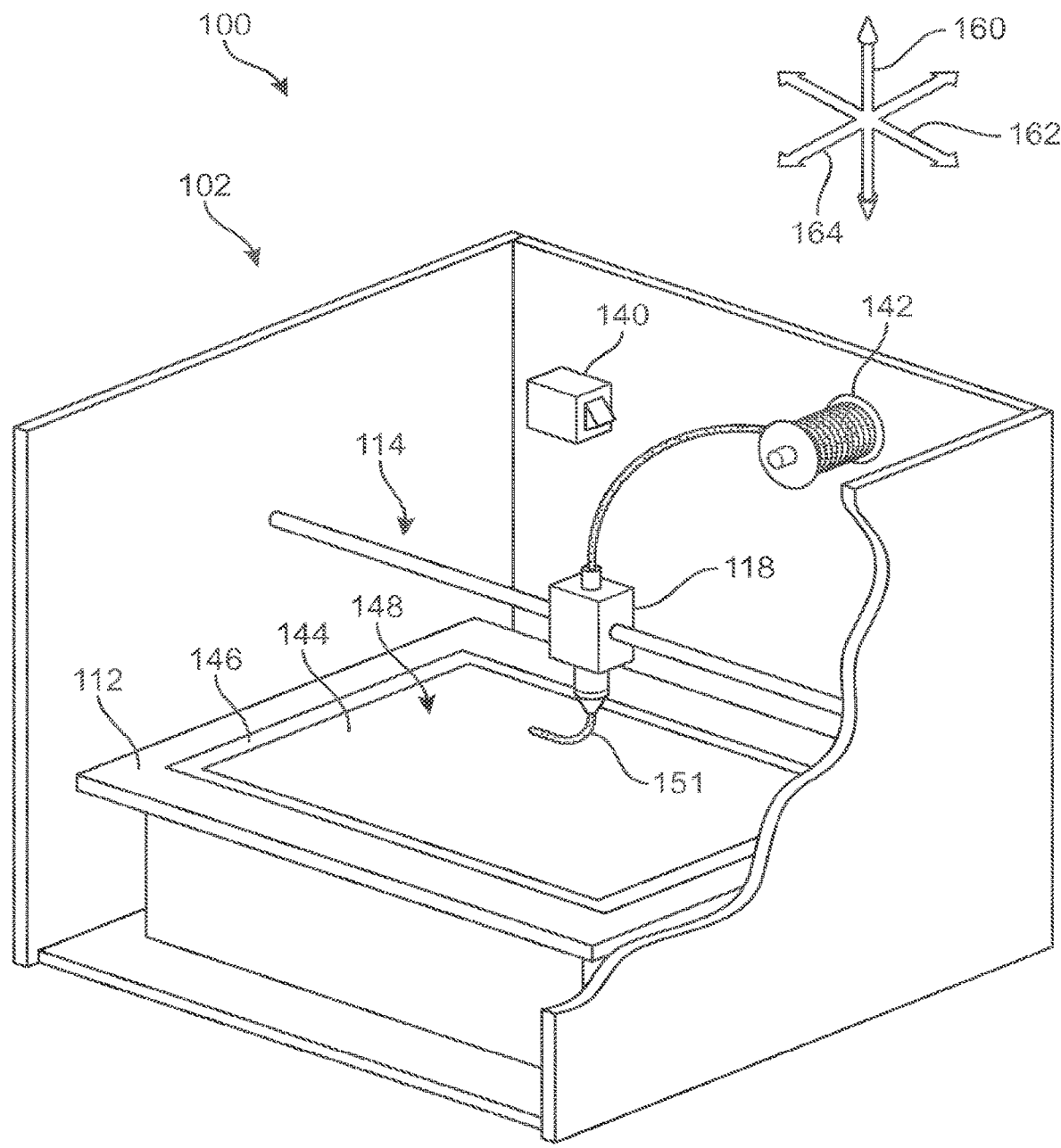
FIG. 2 is a schematic view of an embodiment of a printing device of the three-dimensional printing system of FIG. 1.

FIG. 2 illustrates printing device 102 of three-dimensional printing system 100. As shown, printing device 102 may include tray 112, actuating system 114 configured to move nozzle 118 along first axis 160, second axis 162, and third axis 164, heating system 140, and material source 142 having yarn 151. It should be understood that the components illustrated in FIG. 2 are simplified from FIG. 1 for discussion purposes only. For example, printing device 102 may include nozzle assembly 116 having multiple nozzles. As such, the particular orientation and positioning of the various components of FIG. 2 are not intended to be limiting and should be treated as such.

As previously noted, printing device 102 may be configured to print directly onto various articles. As shown in FIG. 2, tray 112 of printing device 102 may support base 144. In the example, base 144 may be substantially planar. It should be understood that base 144 may include one or more protrusions and/or one or more cavities (not shown). Moreover, printing device 102 may print on surfaces having any suitable shape. As shown, tray 112 may support base 144 that is rectangular. In other examples, the tray may support a base that is circular, triangular, and/or shaped like an upper for an article of footwear (not shown). In the example, elastic layer 146 may prevent the tray 112 from impacting the nozzle 118.

Figure 3:
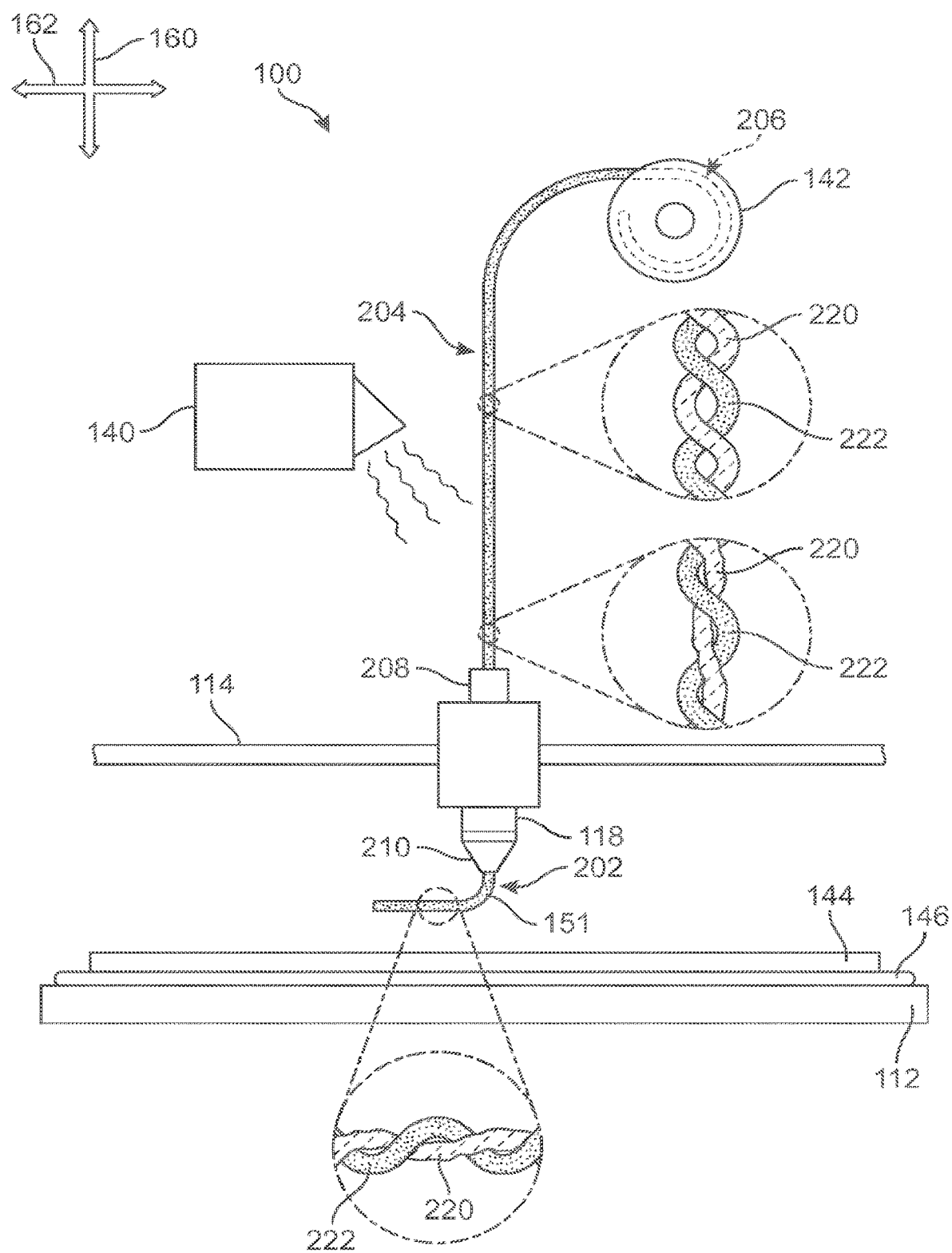
FIG. 3 is a schematic view of an embodiment of a printing system in a first state.

FIG. 3 is an alternative view of the printing system 100, in accordance to an exemplary embodiment. As shown the printing system 100 may include tray 112 holding elastic layer 146 and base 144, actuating system 114 configured to move nozzle 118 along first axis 160 and second axis 162, heating system 140, and material source 142 having yarn 151. It should be understood that the components illustrated in FIG. 3 are simplified from FIGS. 1 and 2 for discussion purposes only. For example, actuating system may move nozzle 118 along third axis (not shown). As such, FIG. 3 is not intended to be limiting and should be treated as such.

As previously mentioned, the nozzle may be configured to dispense any suitable material. As shown in FIG. 3, nozzle 118 may dispense yarn 151. In some embodiments, the yarn may include one or more features disclosed in Sterman et al., U.S. Patent Publication Number 2016/0053410, published on Feb. 25, 2016, titled "Thread Structure Composition and Method of Making," (now U.S. patent application Ser. No. 14/466,319, filed on Aug. 22, 2014), which is herein incorporated by reference. For instance, in some embodiments, the yarn may include a melt resistant material and/or a heat moldable material. As shown in FIG. 3, yarn 151 may include melt resistant material 222 and heat moldable material 220. In other examples, yarn 151 may omit a melt resistant material and/or a heat moldable material.

As used herein, a heat moldable material may be any material that is substantially moldable (or pliable) above a predetermined temperature, such as a glass-transition temperature and/or a melting temperature. In one embodiment, a heat moldable material has one or more thermal properties such as a glass-liquid transition ("glass transition") temperature and/or a melting temperature. For example, the heat moldable material may be a thermoplastic material having a glass transition temperature and a melting temperature. As used herein, thermoplastic materials may include, for example, acrylic, nylon, polybenzimidazole, polyethylene, polypropylene, polystyrene, polyvinyl chloride, polytetrafluoroethylene (TEFLON), and the like.

As used herein, the term "melt resistant material" may refer to any material without a melting temperature (e.g., a material that combusts above a predetermined temperature such as an paper) or any material with a melting temperature well above a predetermined threshold temperature (e.g., most metals which have a melting temperature significantly above a threshold temperature of about 500° C.). Melt resistant materials may be formed of various materials. In one embodiment, melt resistant materials include materials that are associated with yarns, yarns and strings used in forming textiles. For example, the melt resistant material may be cotton. Additionally exemplary materials of melt resistant materials may include wool, flax, and cotton, as well as other one-dimensional materials. Melt resistant materials may be formed using various sources of yarn material. Such sources may include animal, plant, mineral, and synthetic sources. Animal material may include, for example, hair, animal fur, animal skin, silk, etc. Plant material may include, for example, grass, rush, hemp, sisal, etc. Mineral material may include, for example, basalt fiber, glass fiber, metal fiber, etc. Synthetic yarns may include, for example, polyester, aramid, acrylic, carbon fiber, etc.

As previously noted, printing system 100 and/or material source 142 may omit a worm-drive, which may be used to push yarn 151 into nozzle 118. Moreover, as described further, printing system 100 may use actuating system 114 to dispense material from material source 142. In some embodiments, material source 142 may include various drives or pumps to help to release material from material source 142 in response to a tension. Moreover, material source 142 may provide any suitable material to facilities printing by printing system 100.

In some embodiments, the heating system may be configured to heat a heat moldable material of the yarn into a liquid state to facilitate tack and drag printing. As illustrated in FIG. 3, heating system 140 may be configured to warm heat moldable material 220, such as, for example, a thermoplastic of the yarn 151 to transition heat moldable material 220 from a solid state into a liquid state. Accordingly, in various embodiments, printing system 100 may be configured to attach heat moldable material 220 onto base 144 by moving nozzle 118 relative to base 144. Heat moldable material 220 may then transition from the liquid state to a solid state to bond with base 144. As discussed further, once attached, actuating system 114 may then dispense yarn 151 from material source 142 utilizing the attachment of yarn 151, thereby facilitating a use of various materials. As shown, yarn 151 may include melt resistant material 222. For example, melt resistant material 222 may be a textile yarn, metallic yarn, a structural element, and the like.

FIGS. 3-18 illustrate a method of tack and drag to attach a yarn onto a base, in accordance to exemplary embodiments. The methods illustrated may be implemented on various devices, may utilize various materials, use different types of bases, and the like. Accordingly, the methods illustrated in FIGS. 3-18 are for illustrative purposes only.

In order to facilitate an initializing of a tack and drag method, a yarn may be fed through a nozzle of the printing system. In one embodiment, a yarn is manually fed from a material source and into the nozzle. As shown in FIG. 3, yarn 151 may be manually fed from material source 142 and into the nozzle 118. In other embodiments, a yarn is automatically fed from the material source into the nozzle. For example, the yarn could be automatically fed from the material source and into the nozzle using a worm-drive (not shown).

The yarn may be fed through the nozzle of the printing system to allow the nozzle to move the yarn along the base. In some embodiments, the yarn may be fed though the nozzle using an inflow opening and an outflow opening. As shown in FIG. 3, tagging segment 202 of yarn 151 may be fed though nozzle 118 using inflow opening 208 and outflow opening 210. In the example, nozzle 118 confines yarn 151 in a portion extending between inflow opening 208 and outflow opening 210. As such, movement of the nozzle may be translated into movement of the yarn, thereby allowing the nozzle to move the yarn along the base.

The yarn may be considered to have any number of segments. In some embodiments, the yarn may include a tagging segment for attachment to the base, an intermediate segment for translating a movement of the nozzle into a movement of the yarn, and a reel segment disposed on a material source. As shown in FIG. 3, yarn 151 may include tagging segment 202 for attaching yarn 151 to base 144. In the example, yarn 151 may include intermediate segment 204 for moving the yarn 151 relative to base 144. In the example, yarn 151 may include reel segment 206 to supply an additional length of yarn 151 in response to a tension in yarn 151. In other embodiments, the yarn may include fewer or more segments. For example, the yarn may include one or more attachment segments for attaching the yarn to the base (not shown). In another example, the yarn may include one or more detachment segments for allowing the yarn to separate from the base (not shown). In yet another example, the reel segment may be omitted.

The tagging segment may be positioned in any suitable manner with the nozzle to facilitate an attachment of the yarn to the base. In some embodiments, the tagging segment extends from the outflow opening. As shown in FIG. 3, tagging segment 202 may extend from outflow opening 210. As such, a movement of the nozzle into the base may facilitate an attachment of the yarn to the base.

The intermediate segment may be positioned in any suitable manner with the nozzle to facilitate a translation of a movement of the nozzle into a movement of the yarn. In some embodiments, the intermediate segment may be positioned within the nozzle. Referring to FIG. 3, intermediate segment 204 may extend between outflow opening 210 and inflow opening 208. In some embodiments, the intermediate segment may extend from a receiving end of the nozzle. As shown, intermediate segment 204 may extend from inflow opening 208. As such, a movement of the nozzle may be translated into a movement of the yarn to facilitate a movement of the yarn.

The reel segment may be positioned in any suitable manner with the printing system to facilitate a supplying of the yarn from the material source. In some embodiments, the reel segment may be part of a material source. As shown in FIG. 3, reel segment 206 may be disposed in material source 142. In the example, material source 142 may be a reel and reel segment 206 of yarn 151 may be wound on material source 142. In other embodiments, the material source may wind the yarn in a stack to facilitate an unwinding of the reel segment (not shown). As such, a tension directed away from the reel segment may be translated into a supplying of the reel segment of the yarn from the material source.

The heating element may be configured to heat one or more segments of the yarn to facilitate attaching the yarn to the base. In some embodiments, the heating element may heat the intermediate segment of yarn for attaching the yarn to the base. Referring to FIG. 3, heating system 140 may warm intermediate segment 204 of yarn 151 for attaching yarn 151 to base 144. In the example, after attachment, a tension may dispense heated intermediate segment 204 from outflow opening 210 for attaching yarn 151 to base 144 (see FIG. 10). In some embodiments, the heating element may warm tagging segment of yarn for attaching the yarn to the base (now shown). In other embodiments, the heating element may warm additional and/or fewer segments of the yarn.

In some embodiments, one or more features of Sterman et al., U.S. Patent Publication Number 2017/0129178, published on May 11, 2017, titled "Selective Attachment of a Thread Structure," (U.S. patent application Ser. No. 14/935, 904), which is herein incorporated by reference, are utilized to provide selective attachment functionality. For example, the actuating system may maintain a separation distance from a base while moving over one or more unattached regions. In the example, the actuating system may move the nozzle into one or more attachment regions such that a separation distance between an upper surface of the base and a lower surface of the base is reduced by a prodding distance. In other embodiments, selective attachment functionality is omitted.

Prior to an attachment of the yarn to the base, the printing device may be considered as operating in a first state. That is, the first state may be an unattached state. In one embodiment, the printing device may be in a first state when the yarn is unsecured. Referring to FIG. 3, printing device 102 may be in the first state while tagging segment 202 is unsecured. As used herein, a yarn or segment may be unsecured from an object when the yarn or segment may be freely moved from the object without damaging the object or the yarn. For example, as shown in FIGS. 3-6, printing device 102 may be in the first state when the tagging segment 202 may be freely moved from base 144 without tearing base 144 or yarn 151.

Figure 4:
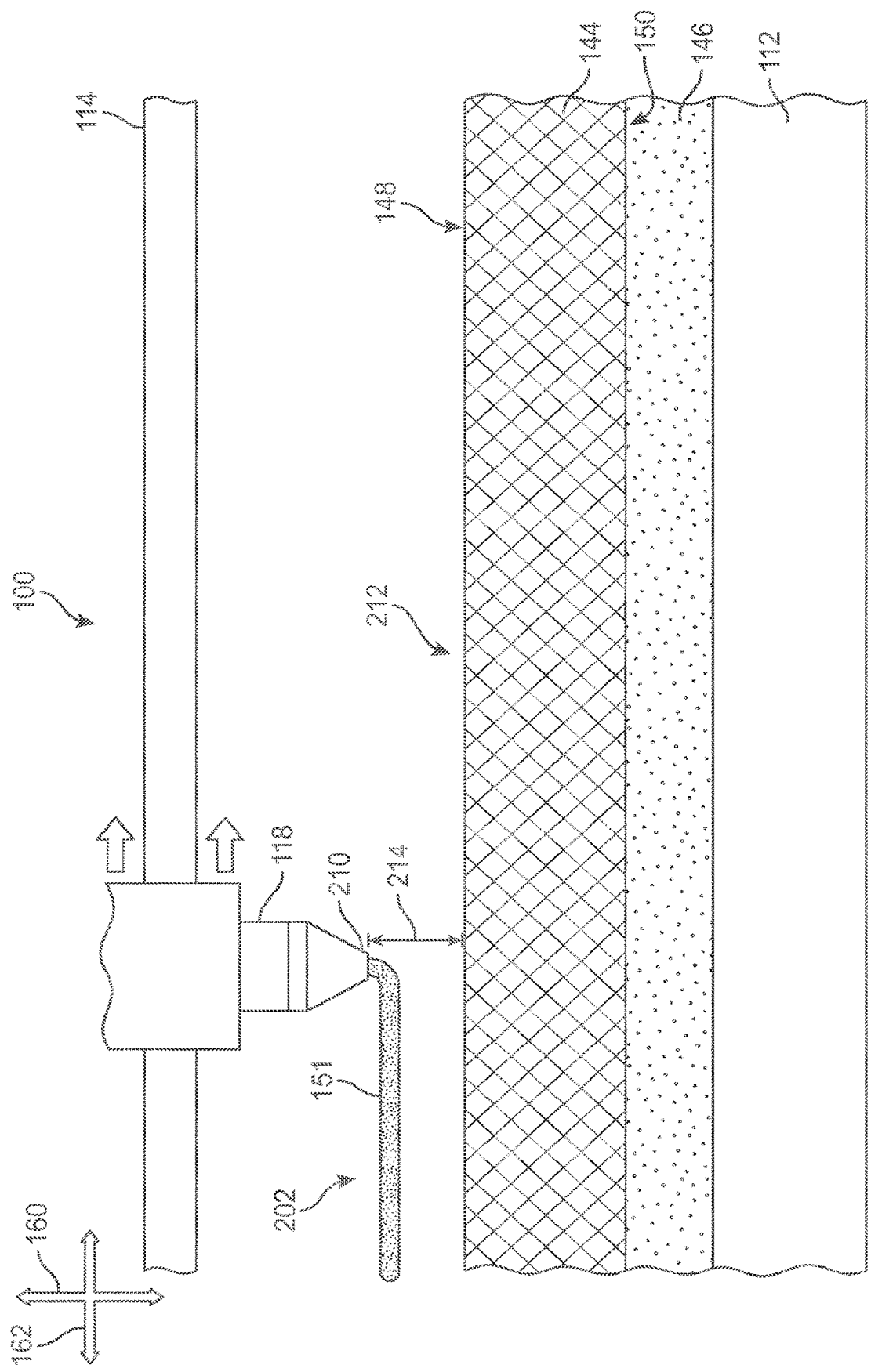
FIG. 4 is a schematic view of moving a nozzle towards an attachment region, in accordance with an exemplary embodiment.

The actuating system may be configured to move the nozzle along the base and/or parallel to the base to facilitate an attachment of the yarn. Referring to FIG. 4, actuating system 114 may move nozzle 118 towards attachment region 212 of print surface 148 of base 144 in a direction parallel to second axis 162. In the example, actuating system 114 may also move nozzle 118 towards attachment region 212 of print surface 148 of base 144 in a direction parallel to third axis 164 (not shown). In other examples, actuating system 114 may move nozzle 118 towards attachment segment 212 of print surface 148 of base 144 in a direction extending along both second axis 162 and third axis 164 (not shown).

In some embodiments, the actuating system maintains, during a first state, a separation distance between the nozzle and the base while moving the nozzle parallel to and/or along the base. Referring to FIG. 4, actuating system 114 maintains predefined separation distance 214 between nozzle 118 and print surface 148 of base 144 while moving nozzle 118 along second axis 162 and/or along third axis 164. In other embodiments, the actuating system moves the nozzle along one or more directions parallel to the base while moving the nozzle perpendicular to the base (not shown).

Figure 5:
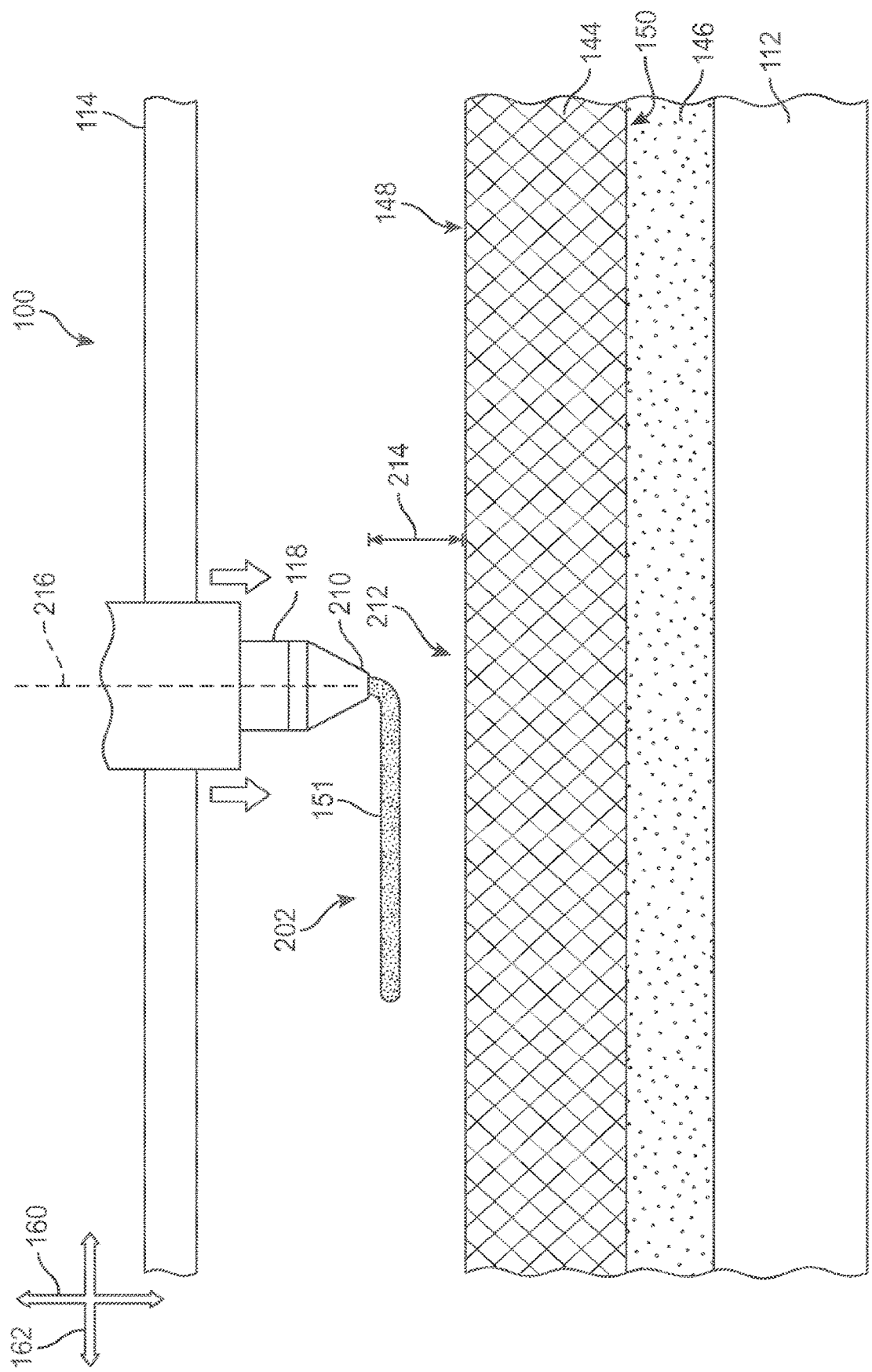
FIG. 5 is a schematic view of lowering a nozzle towards the attachment region of FIG. 4, in accordance with an exemplary embodiment.

The actuating system may be configured to move the nozzle perpendicular to the base and towards an attachment position on the upper surface of the base to facilitate an attachment of the yarn. As shown in FIG. 5, actuating system 114 moves and/or lowers the nozzle 118 towards attachment region 212 of print surface 148 of base 144 in a direction parallel to first axis 160.

In some embodiments, the actuating system maintains a base position of the nozzle along one or more directions parallel to the base while moving the nozzle perpendicular to the base. Referring to FIG. 5, actuating system 114 maintains base position 216 of nozzle 118 along second axis 162 and/or along the third axis (not shown) while moving and/or lowering nozzle 118 in a direction parallel to first axis 160. In other embodiments, the actuating system may move and/or lower the nozzle perpendicular to the base while moving the nozzle along one or more directions parallel to the base (not shown).

Figure 6:
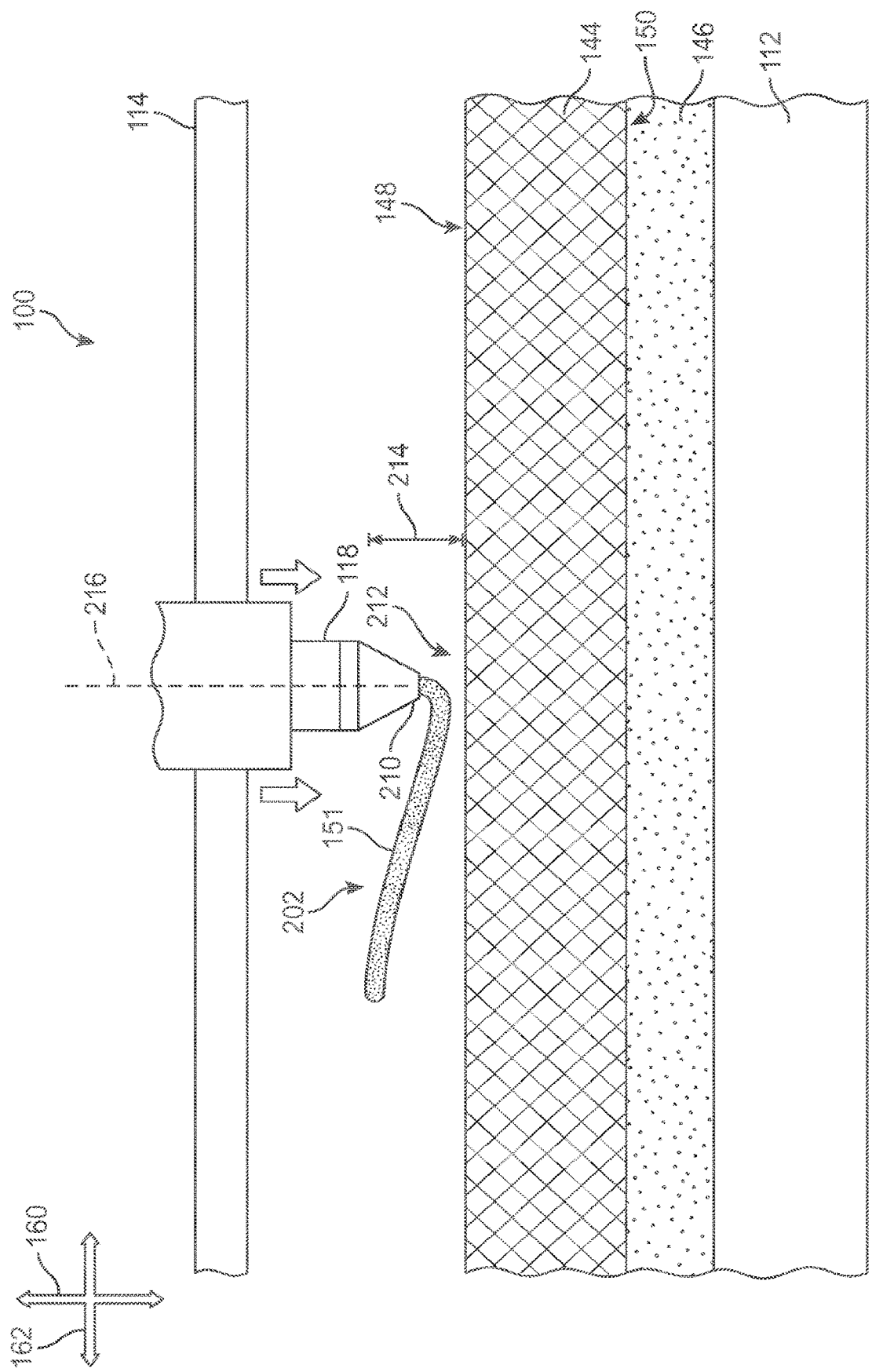
FIG. 6 is a schematic view of a process of moving a nozzle into the attachment region of FIG. 4, in accordance with an exemplary embodiment.

Some embodiments permit the tagging segment to be attached to a base using a nozzle. In some instances, the actuating system may move the nozzle into the base to facilitate an attachment of the yarn to the base. As shown in FIG. 6, actuating system 114 may move outflow opening 210 of nozzle 118 into base 144 to facilitate an attachment of yarn 151 to base 144. In some embodiments, the yarn may be placed in direct contact with the upper surface of the base. Referring to FIG. 6, yarn 151 may be placed in direct contact with print surface 148 of base 144. In other embodiments, the outflow opening and the yarn may be placed in direct contact with the upper surface of the base (not shown).

It should be understood that while the printing system is in the first state (e.g., unattached or unsecured) the various movements of the nozzle may be without a corresponding increase in tension of the yarn. Referring to FIGS. 4-6, a tension of the tagging segment 202 of the yarn 151 may be constant during each of the movements illustrated in FIGS. 4-6. In some embodiments, a tension of the intermediate segment (not shown) of the yarn may be constant during each of the movements illustrated in FIGS. 4-6. In yet another example, a tension of the reel segment (not shown) of the yarn may be constant during each of the movements illustrated in FIGS. 4-6.

Figure 7:
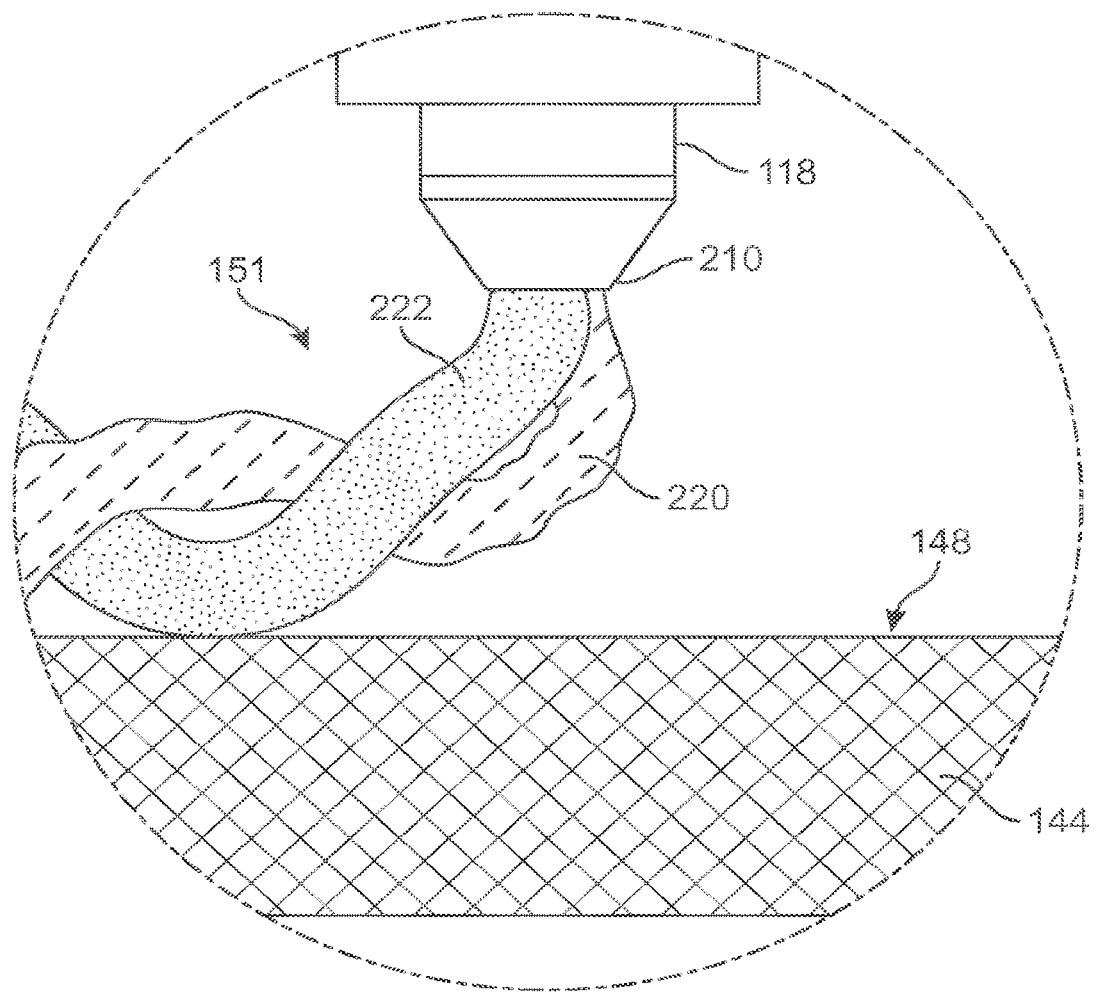
FIG. 7 is a schematic view of a yarn prior to moving the nozzle into attachment region of FIG. 4, in accordance with an exemplary embodiment.
Figure 8:
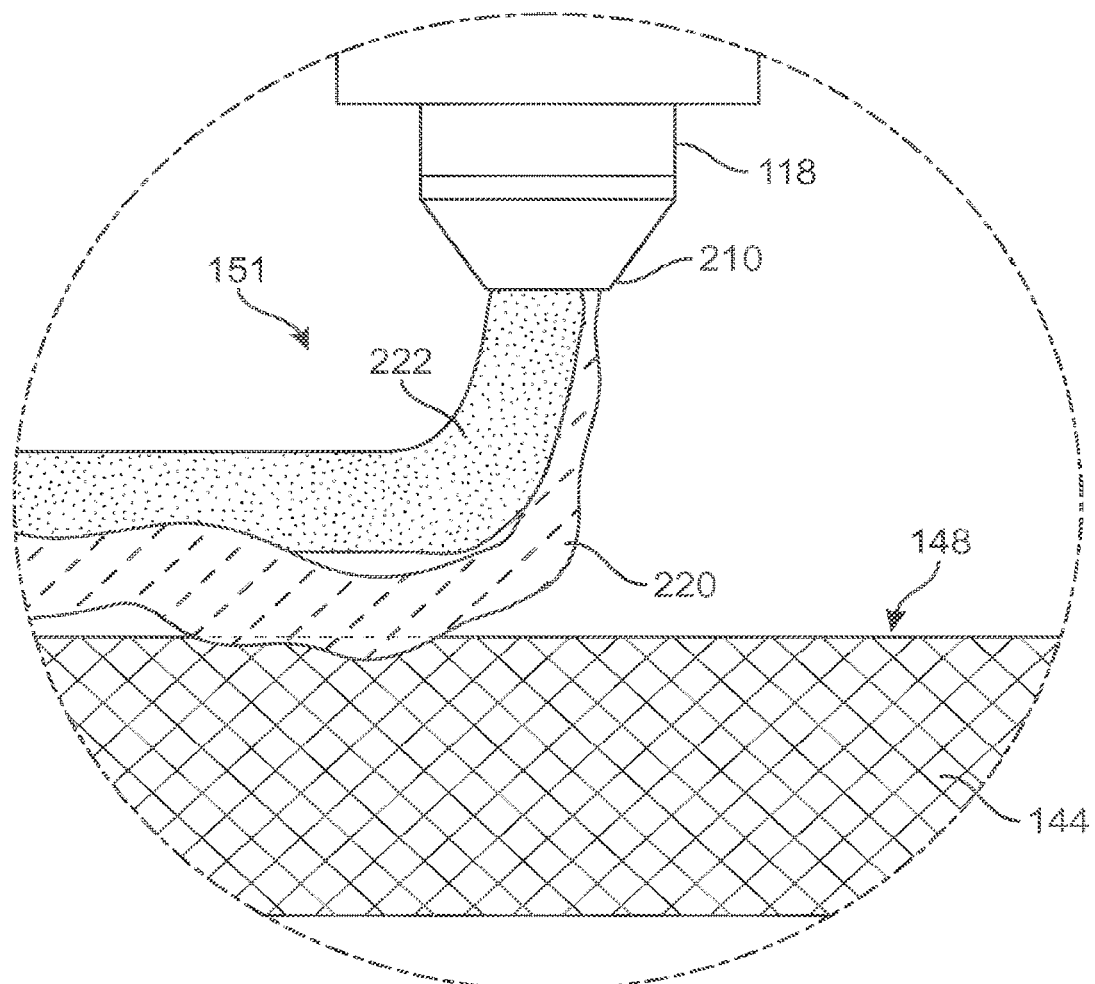
FIG. 8 is a schematic view of a process of moving a nozzle into the attachment region of FIG. 4, in accordance with an exemplary embodiment.
Figure 9:
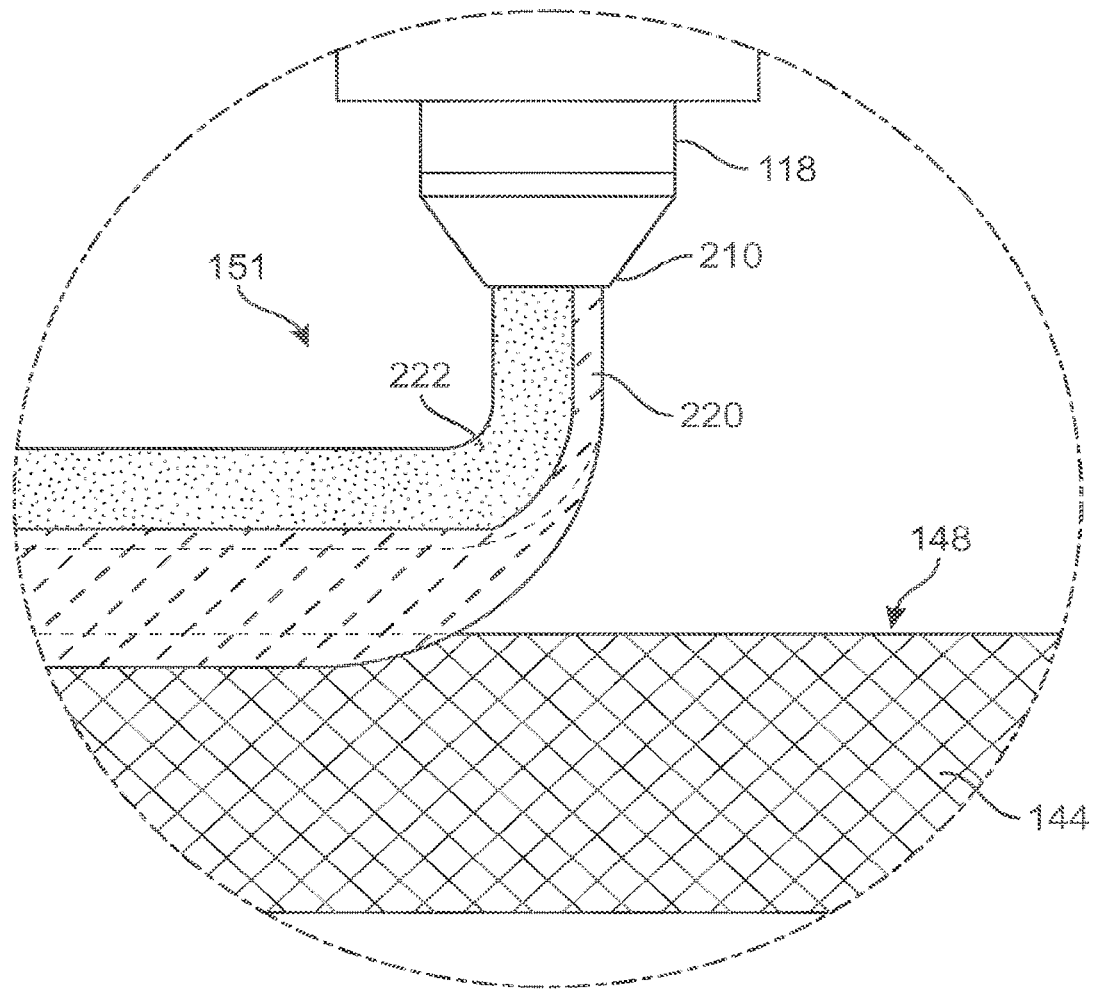
FIG. 9 is a schematic view of a yarn after moving the nozzle into attachment region of FIG. 4, in accordance with an exemplary embodiment.

The yarn may include one or more materials to facilitate attachment of the yarn to the base. In some embodiments, the yarn includes a heat moldable material. As shown in FIG. 7, yarn 151 may include heat moldable material 220 which may be in a liquid state. In the example, actuating system 114 may move yarn 151 to encourage heat moldable material 220 into base 144. Additionally, in the example and as shown in FIG. 8, heat moldable material 220 extends through print surface 148 and into base 144. Further, in the example and as shown in FIG. 9, heat moldable material 220 may transition from the liquid state into a solid state, thereby bonding yarn 151 to base 144. In other embodiments, the yarn includes other materials. For example, yarn 151 may include an adhesive (not shown).

The yarn may include one or more materials to facilitate a tension (e.g., pulling, attachment, etc.) to supply or dispense the yarn to attach to the base. In some embodiments, the yarn includes a melt resistant material. For example, as shown in FIGS. 7-9, melt resistant material 222 is in a solid state when the heat moldable material 220 is in the liquid state. In the example, the melt resistant material 222 may accordingly translate pulling forces along points of the melt resistant material 222 into a tension, thereby facilitating use of tension to supply the yarn to attach to the base.

After an attachment or securing of the yarn to the base, the printing device may be considered as operating in a second state. That is, the second state may be an attached state or a secured state. In one embodiment, the printing device may be in a second state when the yarn is secured. For example, printing device may be in the second state when tagging segment 202 is secured. For example, as shown in FIGS.

9-18, printing device 102 may be in the second state when the tagging segment 202 is bonded to base 144 by heat moldable material 220.

Once the yarn is attached to the base, the actuating system may position a nozzle in any suitable manner to facilitate a dispensing of yarn from the nozzle. In some embodiments, the actuating system may move the nozzle in a direction normal to the base. For example, actuating system 114 may elevate nozzle 118 to dispense a yarn (see FIG. 12). In another example, actuating system 114 may lower nozzle 118 to dispense a yarn. In some embodiments, the actuating system may move the nozzle along and/or parallel to a base (see FIG. 13). In some embodiments, the actuating system may move the nozzle away from a tagging segment (see FIGS. 12 and 13). In other embodiments, the actuating system may move the nozzle differently to facilitate a dispensing of yarn from the nozzle.

Figure 10:
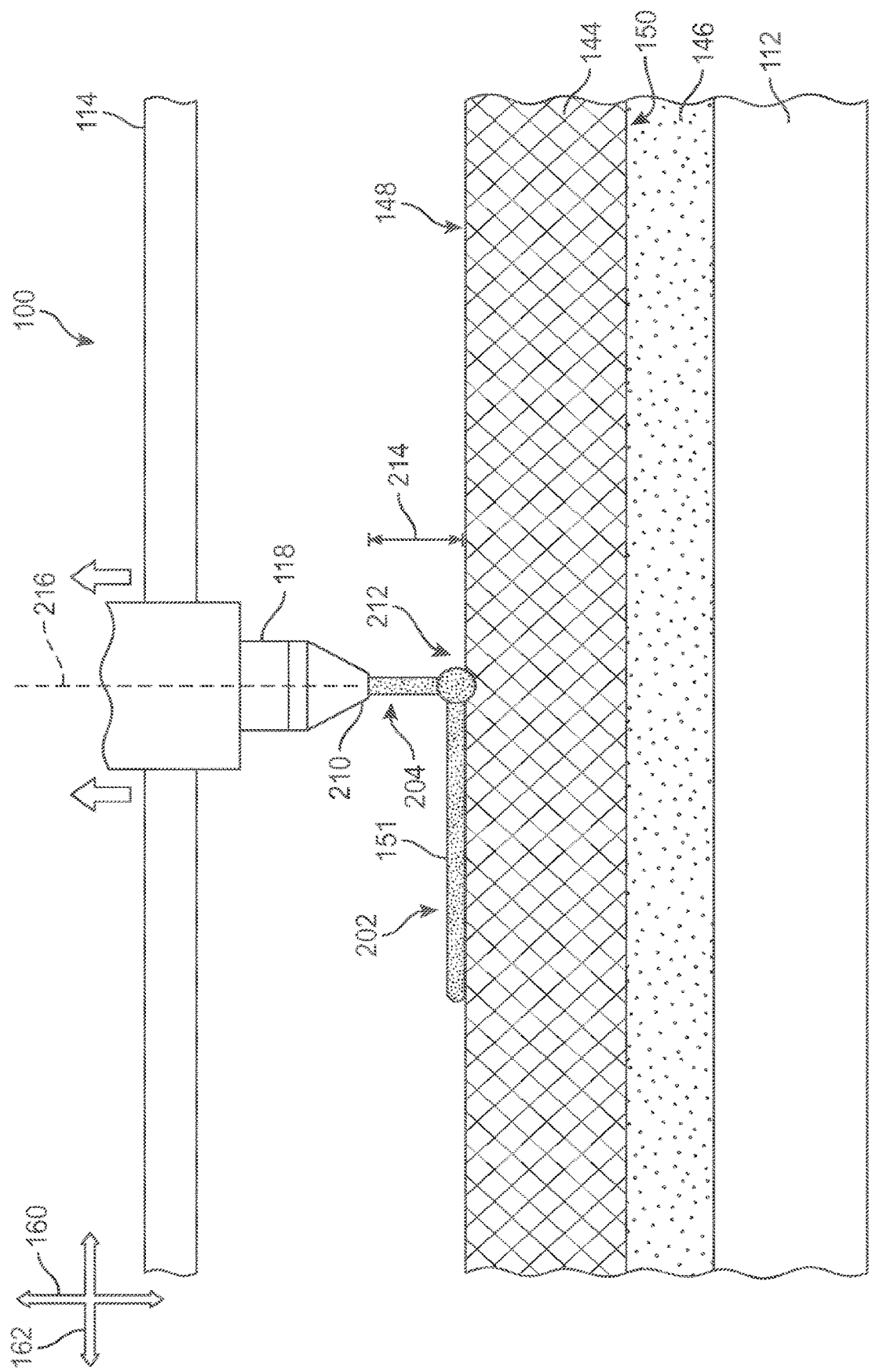
FIG. 10 is a schematic view of a yarn attached to the attachment region of FIG. 4, in accordance with an exemplary embodiment.

In some embodiments, the moving, by the actuating system, of the nozzle away from the attachment region supplies or dispenses the intermediate segment of the yarn from the outflow opening of the nozzle. Referring to FIG. 10, actuating system 114 may move nozzle 118 in a direction parallel to first axis 160 and away from attachment region 212. In the example, intermediate segment 204 of yarn 151 may be dispensed from outflow opening 210 of nozzle 118 by the movement of nozzle 118 away from attachment region 212. As such, the movement of actuating system 114 may supply yarn 151 from nozzle 118 without the use of an extruder system such as a worm-drive.

Figure 11:
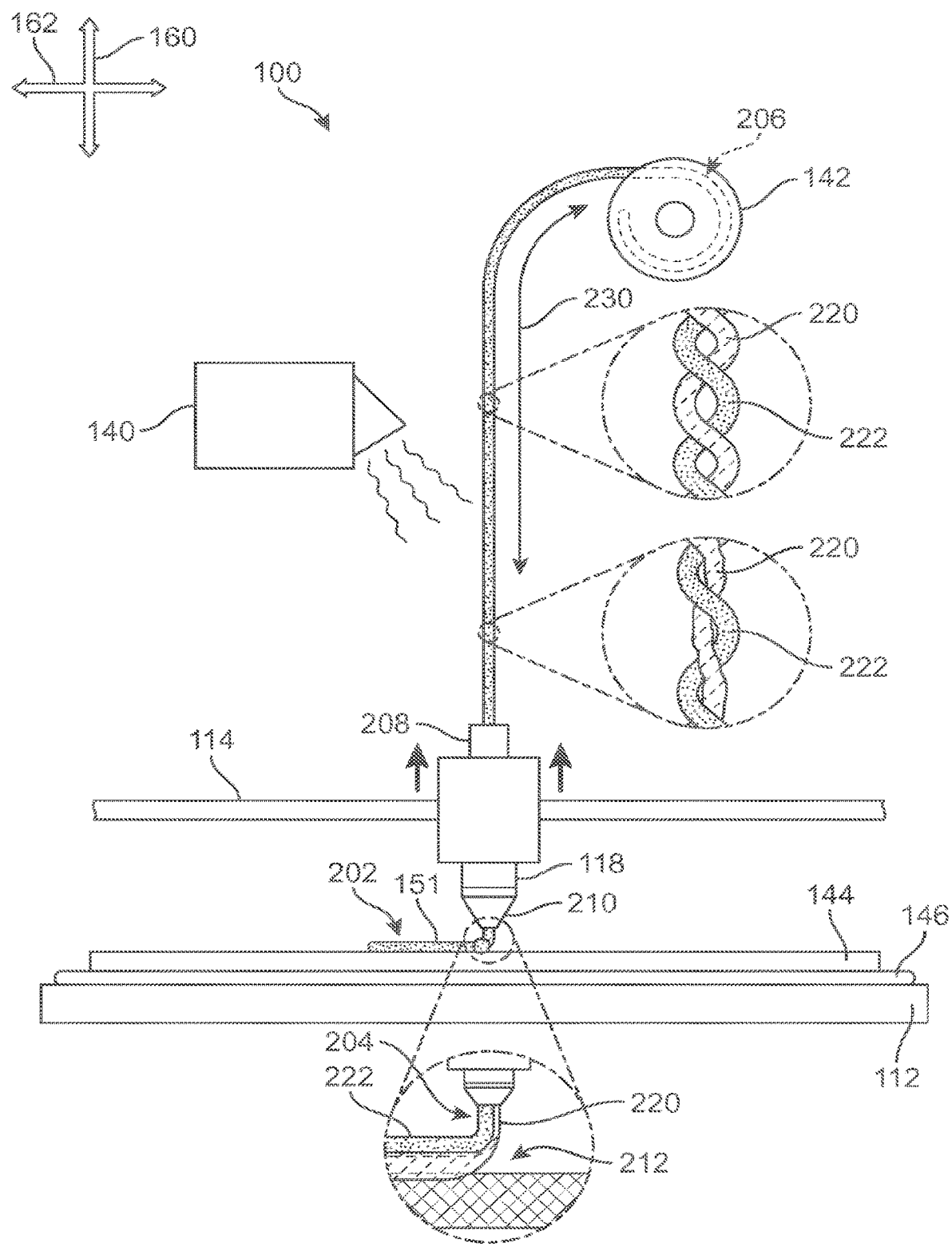
FIG. 11 is a schematic view of an embodiment of the printing system of FIG. 3 in a second state.
Figure 12:
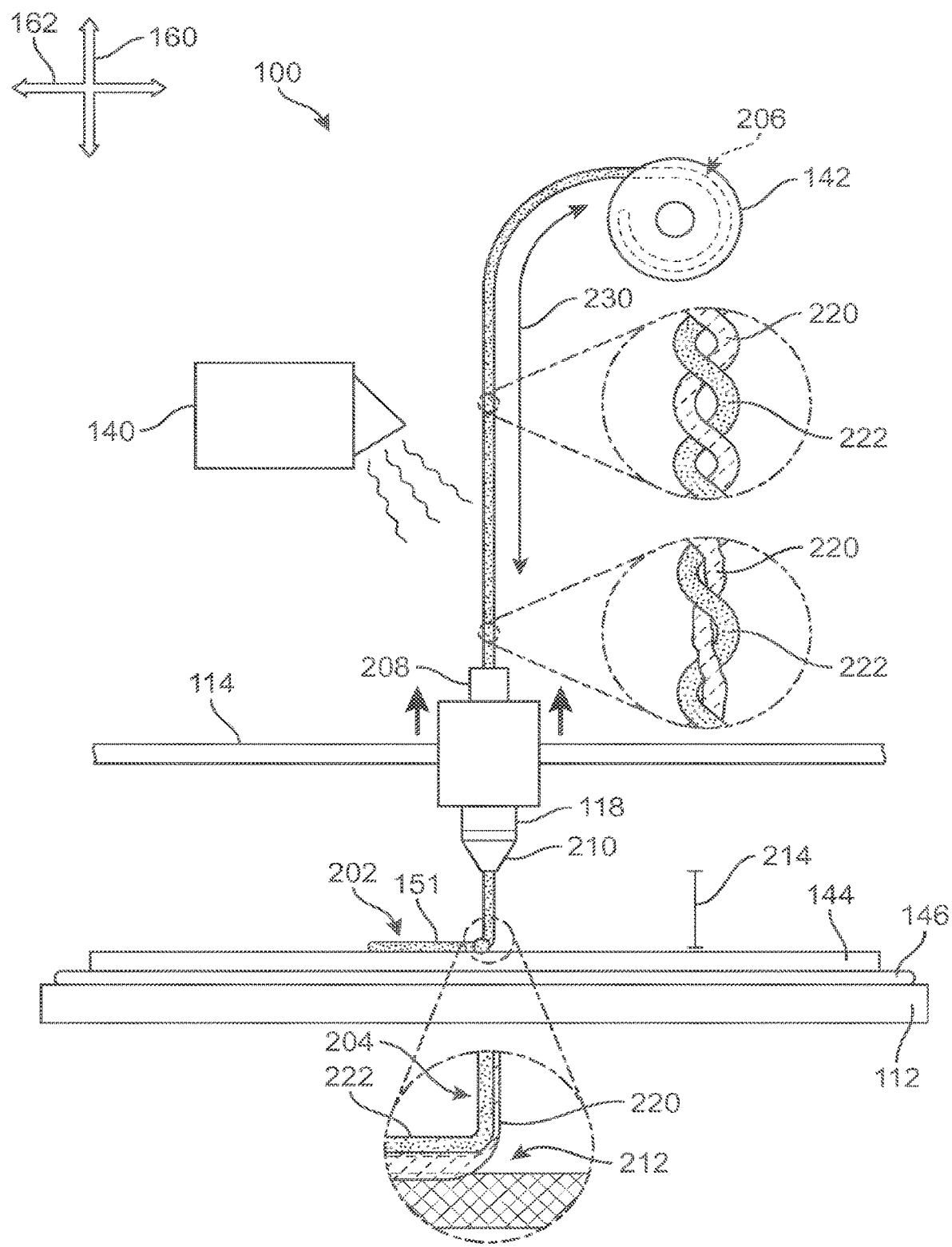
FIG. 12 is a schematic view of a nozzle after elevating the nozzle away the attachment region of FIG. 4 during a second state, in accordance with an exemplary embodiment.

In some embodiments, the actuating system may supply yarn from the nozzle while maintaining a tension between the intermediate segment and the material source. As shown in FIGS. 11-12, actuating system 114 may supply yarn 151 from nozzle 118 while maintaining pre-attachment tension 230 between intermediate segment 204 and material source 142. In the example, nozzle 118 changes a position along yarn 151 and thus maintains pre-attachment tension 230. In other embodiments, the actuating system may supply yarn from the nozzle and may change the tension between the intermediate segment and the material source (not shown).

The nozzle may be moved away from the base to any suitable separation distance from the base after attaching the tagging segment to the base. In some embodiments, the nozzle may be moved away from the base to a predefined separation distance from the base. As illustrated in FIG. 12, nozzle 118 may be moved upward in a direction parallel to first axis 160 to predefined separation distance 214. In other embodiments, the nozzle may be positioned differently with the base.

Figure 13:
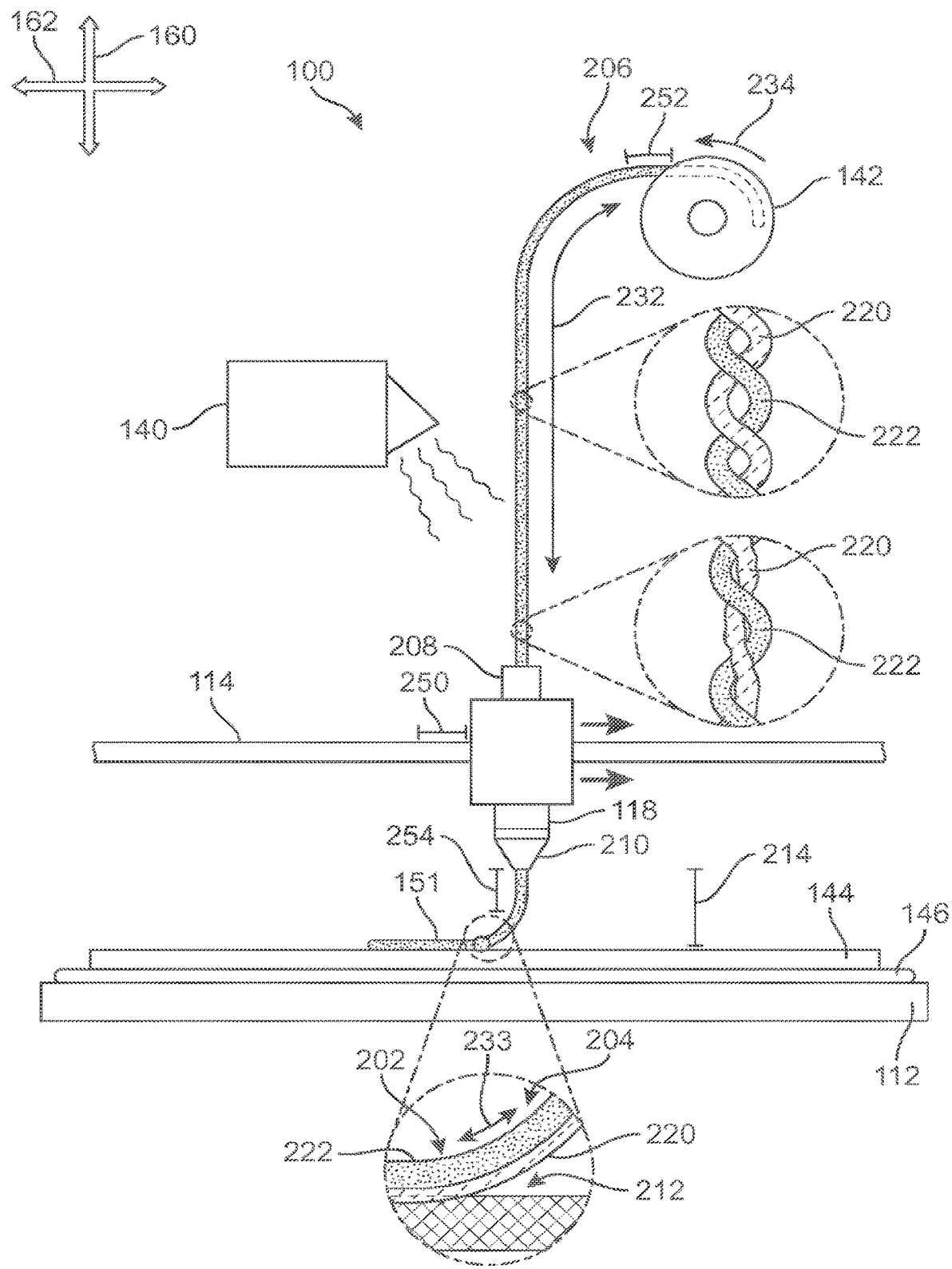
FIG. 13 is a schematic view of a process of moving a nozzle parallel to the base and away from an attachment region of FIG. 4 during a second state, in accordance with an exemplary embodiment.

The actuating system may be configured to move the nozzle in any suitable direction to facilitate a dispensing of yarn after attaching the tagging segment to the base. In some embodiments, the actuating system may move the nozzle away from the attachment region and/or base. As illustrated in FIG. 12, actuating system 114 may move and/or elevate nozzle 118 in a direction parallel to first axis 160 and away from attachment region 212 and base 144. In some embodiments, the actuating system may move the nozzle along the base. As illustrated in FIG. 13, actuating system 114 may move nozzle 118 in a direction parallel to second axis 162 and/or in direction parallel to third axis (not shown). In the example, reel segment 206 of yarn 151 may be supplied from material source 142 by tension 232. As shown, tension 232 in yarn 151 may be applied by base 144 on tagging segment 202 during the second state. As such, the movement of the actuating system may supply yarn 151 from material source 142 without the use of an extruder system such as a worm-drive.

In some embodiments, the nozzle may be moved away from the tagging segment to facilitate a dispensing of yarn. As illustrated in FIGS. 12-13, actuating system 114 may move nozzle 118 in directions parallel to one or more of first axis 160, second axis 162, and third axis 164 to move nozzle 118 away from tagging segment 202. In the example, reel segment 206 of yarn 151 may be supplied from material source 142 by tension 232. As such, the movement of the actuating system may supply yarn 151 from material source 142 without the use of an extruder system such as a worm-drive. In other embodiments, the nozzle may be moved towards the tagging segment to facilitate a dispensing of yarn.

In those instances where the actuating system moves the nozzle along the base to facilitate a dispensing of yarn from the material source, the nozzle may be spaced apart from the base by any suitable distance. In some embodiments, the nozzle may be spaced apart from the base by a predefined separation distance during the moving the nozzle along the base. As illustrated in FIG. 13, nozzle 118 may be spaced apart by predefined separation distance 214 while the nozzle 118 is moved along the second axis 162 and/or the third axis (not shown) and away from attachment region 212. In other embodiments, a separation distance between the nozzle and the base may vary during the moving the nozzle along the base (not shown).

In some embodiments, the actuating system may generate an attachment tension between the tagging segment at the attachment region and the intermediate segment. Referring to FIG. 13, actuating system 114 may provide attachment tension 233 between tagging segment 202 at attachment region 212 and intermediate segment 204. In the example, attachment tension 233 is equal to tension 232. In other examples, attachment tension 233 and tension 232 are different.

Some embodiments permit a dispensing of yarn from the material source to be related to the movement of the nozzle. In some embodiments, the material source supplies a first length of yarn proportional to a distance moved by the nozzle. As illustrated in FIG. 13, actuating system 114 may move nozzle 118 distance 250. In the example, distance 250 may be in a direction parallel to second axis 162 and/or along base 144. In the example, material source 142 may supply or dispense length 252 of yarn 151 that is equal to distance 250. In other embodiments, yarn from the material source may be dispensed differently.

In some embodiments, the material source supplies a length of yarn proportional to a tension along the yarn. Referring to FIG. 13, actuating system 114 may move nozzle 118, thereby generating tension 232 and attachment tension 233. In the example, material source 142 may supply or dispense length 252 of yarn 151 in response to tension 232 and/or attachment tension 233. In other examples, the actuating system may generate a tension less (or greater) than the tension 232 and/or attachment tension 233 and the material source may supply or dispense a length of the yarn that is less (or greater) than length 252. In other embodiments, the material source supplies yarn differently in response to tension.

In some embodiments, the tension in the yarn may dispense a length of the yarn from the outflow opening. As illustrated in FIG. 13, tension 232 in yarn 151 may result in nozzle 118 dispensing length 254 of yarn 151 from outflow opening 210. Therefore, the dispensing of yarn 151 from outflow opening 210 may be related to the movement of nozzle 118 by actuating system 114. In other embodiments, the yarn may be dispensed differently from the outflow opening.

In those instances where a material source rotates, the actuating system may rotate the material source to supply yarn from the material source. As illustrated in FIG. 13, actuating system 114 may provide tension 232 between tagging segment 202 and the material source 142. In the example, tension 232 translates into rotation rate 234 of material source 142 to supply yarn 151. In other embodiments, the material source may rotate differently.

In those instances where an actuating system rotates the material source, the material source may rotate at any suitable rotation rate. In some embodiments, the material source may have a rotation rate that is proportional to a movement rate of the nozzle. As illustrated in FIG. 13, rotation rate 234 may be proportional to the movement of nozzle 118 along distance 250. Accordingly, actuating system 114 may generate rotation rate 234 of material source 142 to supply yarn 141 from material source 142. In other embodiments, the material source may have a different rotation rate.

Figure 14:
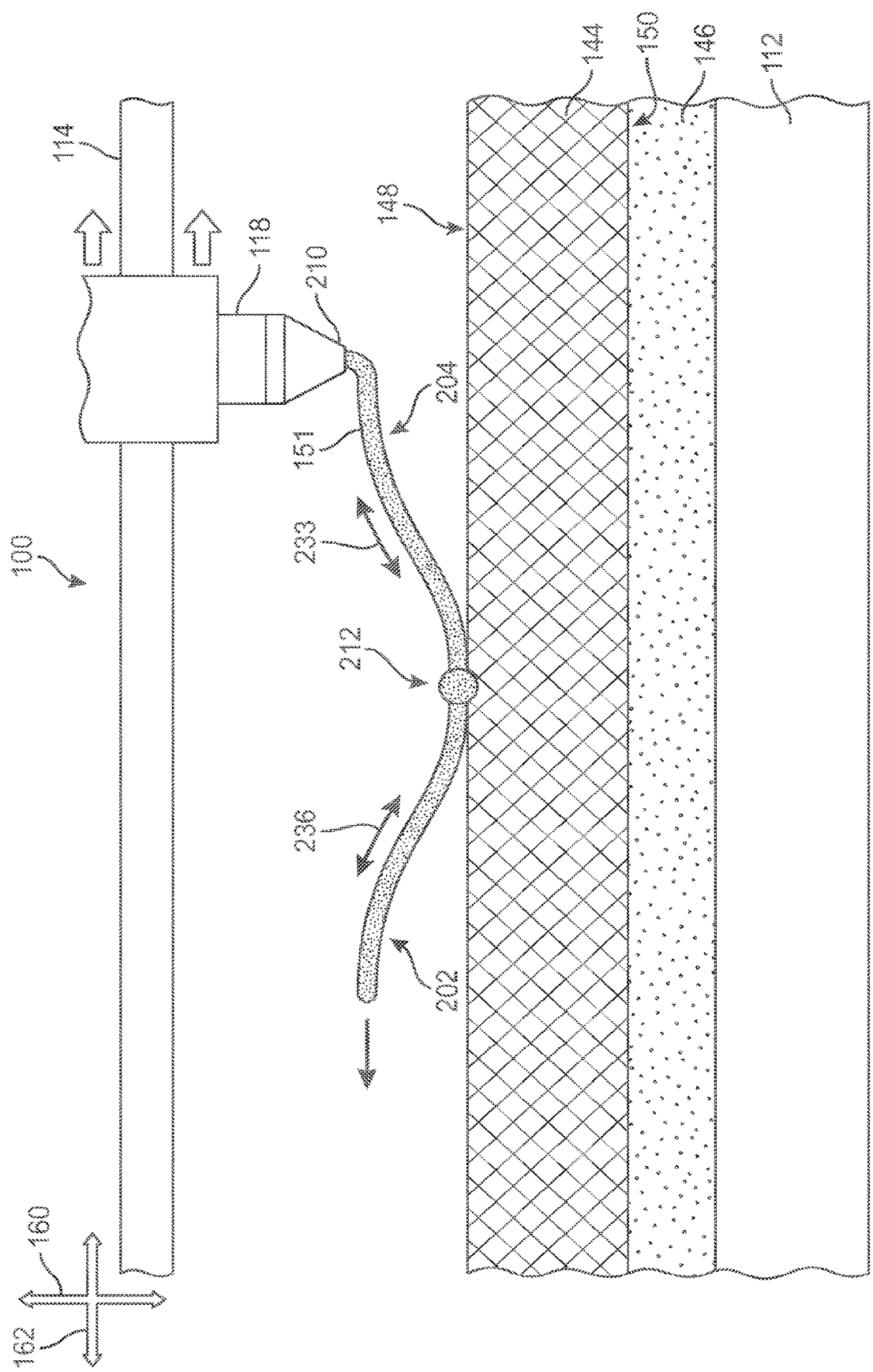
FIG. 14 is a schematic view of a yarn having a tag tension and an attachment tension, in accordance with an exemplary embodiment.

The actuating system may be configured to permit any suitable tension to facilitate a dispensing of yarn. In some embodiments, a tension may extend from the attachment region. As illustrated in FIG. 14, attachment tension 233 may extend from attachment region 212 and along intermediate segment 204. Such a tension may be used to dispense yarn 151 from nozzle 118. Similarly, in some embodiments, a tag tension may extend from the attachment region. For example, tag tension 236 may extend from attachment region 212 and along tagging segment 202. Such a tension may be used to position tagging segment 202 onto the base 144. In other embodiments, other tensions may be used.

It should be understood that the various tensions may include different levels of tension and/or slack. Referring to FIG. 14, tag tension 236 may be slack or not taut (not shown). In the example, attachment tension 233 may result from a force applied. For example, attachment tension 233 may result from a force applied by actuating system 114 to position nozzle 118 and intermediate segment 204 on print surface 148. In the example, tag tension 236 may result from a force applied. For example, tag tension 236 may result from a force applied by hand to position tagging segment 202 on print surface 148. Similarly, the attachment tension may be slack (not shown) or may have a different degree of tension (e.g., newtons per meter) than the tag tension.

Figure 15:
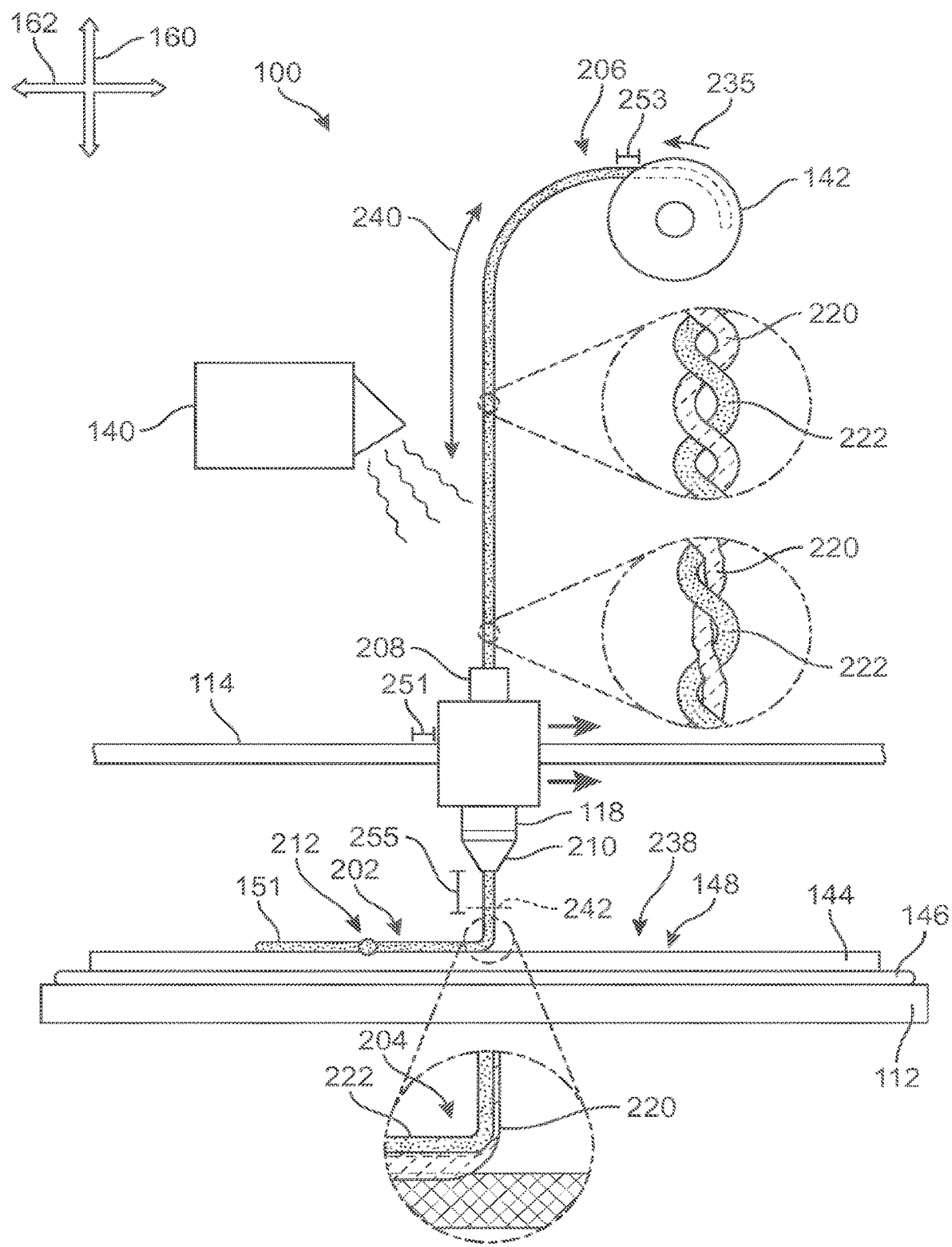
FIG. 15 is a schematic view of a process of moving a nozzle parallel to the base and towards an attachment region during a second state, in accordance with an exemplary embodiment.

In some embodiments, the actuating system may supply yarn from the material source while positioning the nozzle to another attachment region of the print surface. As illustrated in FIG. 15, actuating system 114 may move nozzle 118 to attachment region 238 of print surface 148. In the example, the positioning of nozzle 118 onto attachment region 238 may result in tension 240 between tagging segment 202 at attachment region 212 and material source 142, thereby dispensing reel segment 206 of yarn 151 from material source 142.

As shown in FIGS. 13 and 15, the displacement of the nozzle may be different and may result in a different length of yarn being supplied by the material source. For example, moving the nozzle the distance 250 may generate a tension 232, thereby resulting in a supply of length 252 of the yarn 151 (see FIG. 13). In contrast, moving the nozzle the distance 251 may generate a tension 240, thereby resulting in a supply of length 253 of the yarn 151 (see FIG. 15). As such, various displacement distances may be may be generated using the actuating system to supply different lengths of the yarn from the material source.

In some embodiments, the outflow opening supplies a length of yarn proportional to a tension along the yarn. For example, tension 232 in yarn 151 may pull length 254 of yarn 151 from outflow opening 210 (see FIG. 13). In the example, tension 240 in yarn 151 may dispense length 255 of yarn 151 from outflow opening 210 (see FIG. 15). As such, various displacement distances may be may be generated using the actuating system to supply different lengths of the yarn from the outflow opening of the nozzle.

Figure 16:
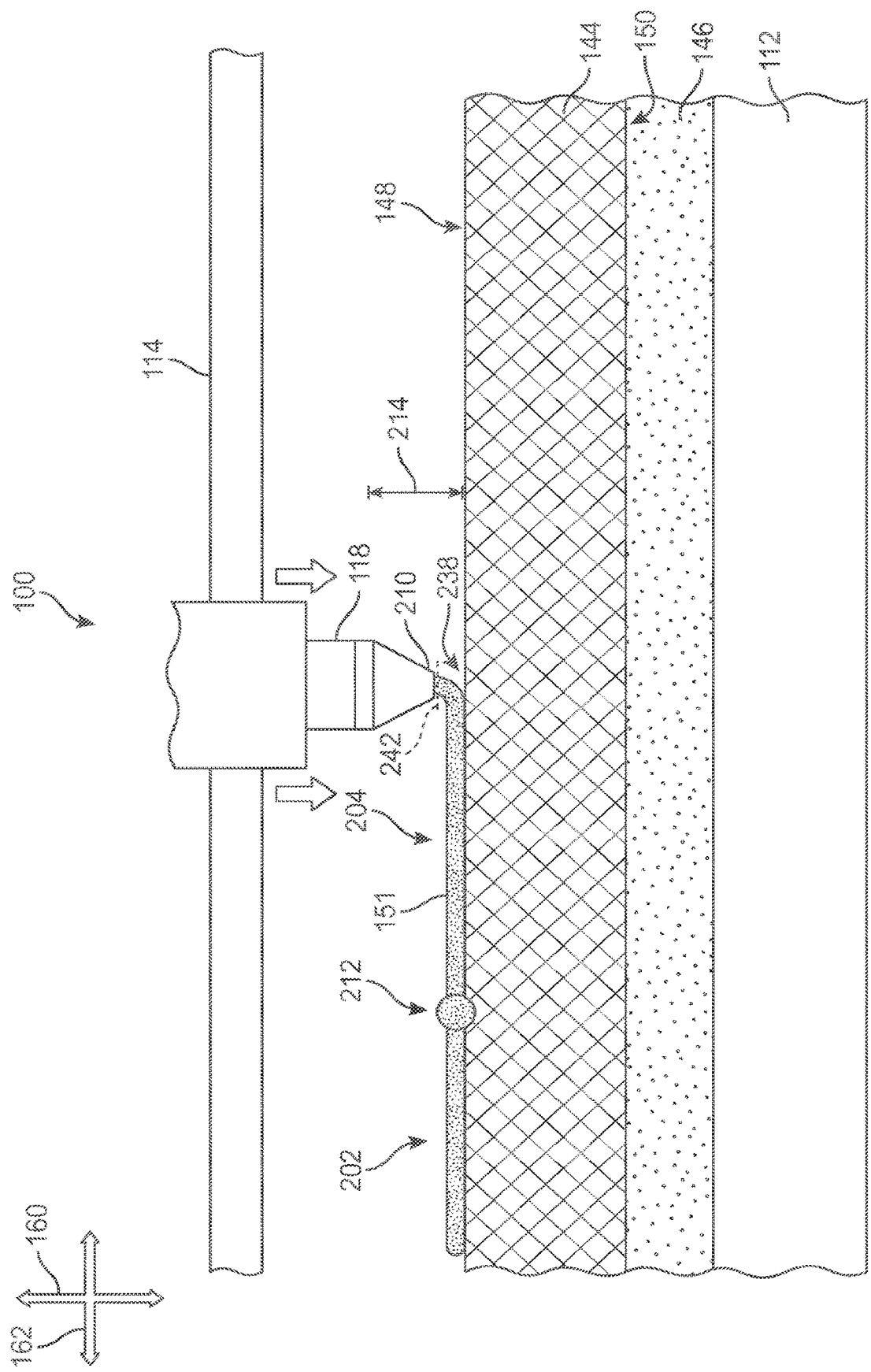
FIG. 16 is a schematic view of a nozzle receiving yarn while lowering a nozzle into the attachment region of FIG. 15, in accordance with an exemplary embodiment.

The actuating system may move the nozzle into the base to facilitate subsequent attachment of the yarn to the base while operating in the second state. As illustrated in FIGS. 15-16, actuating system 114 may move outflow opening 210 of nozzle 118 into base 144 to facilitate an attachment of yarn 151 to attachment region 238 of print surface 148 of base 144. In some embodiments, the yarn may be placed in direct contact with the upper surface of the base. As shown, yarn 151 may be placed in direct contact with print surface 148 of base 144. In other embodiments, the outflow opening and the yarn may be placed in direct contact with the upper surface of the base (not shown).

In some embodiments, the actuating system may position the nozzle to receive yarn into the outflow opening while moving the nozzle into the base. As illustrated in FIGS. 15-16, actuating system 114 may position the nozzle 118 to receive yarn 151 into outflow opening 210 up to position 242 of yarn 151 while moving or lowering outflow opening 210 of nozzle 118 into base 144. In other embodiments, the actuating system may maintain a position of the nozzle along the yarn while moving the nozzle into the base.

Figure 17:
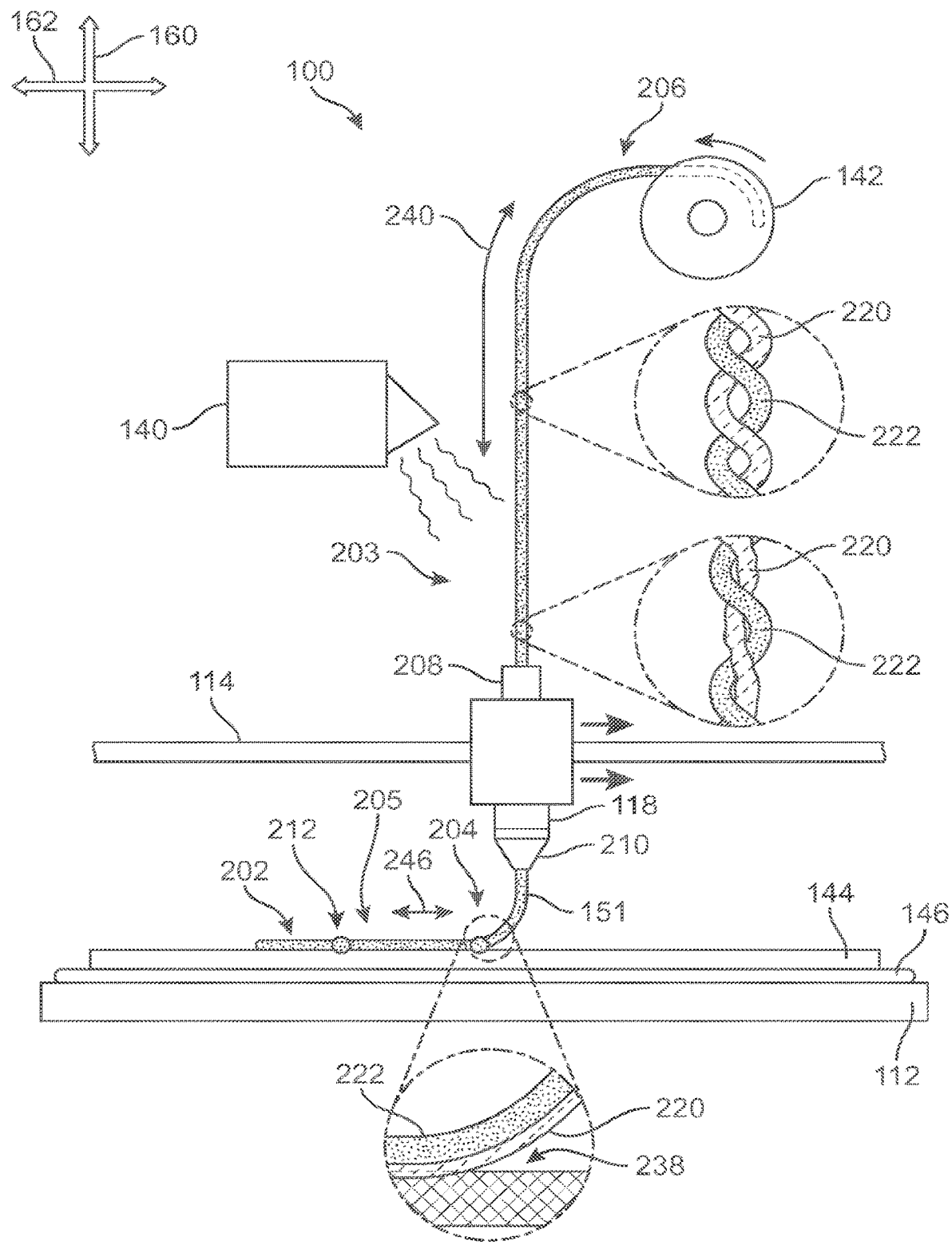
FIG. 17 is a schematic view of a process of moving a nozzle away from the attachment region of FIG. 15 during a second state, in accordance with an exemplary embodiment.

It should be understood that subsequent attachment of the yarn to attachment regions may change a tension along the yarn. As illustrated in FIG. 17, portion 203 of intermediate segment 204 extending between inflow opening 208 and reel segment 206 may have tension 240. In the example, portion 205 of intermediate segment 204 extending between attachment region 212 and attachment region 238 may have relaxed tension 246. Therefore, portions and/or segments of the yarn may have different tensions.

Figure 18:
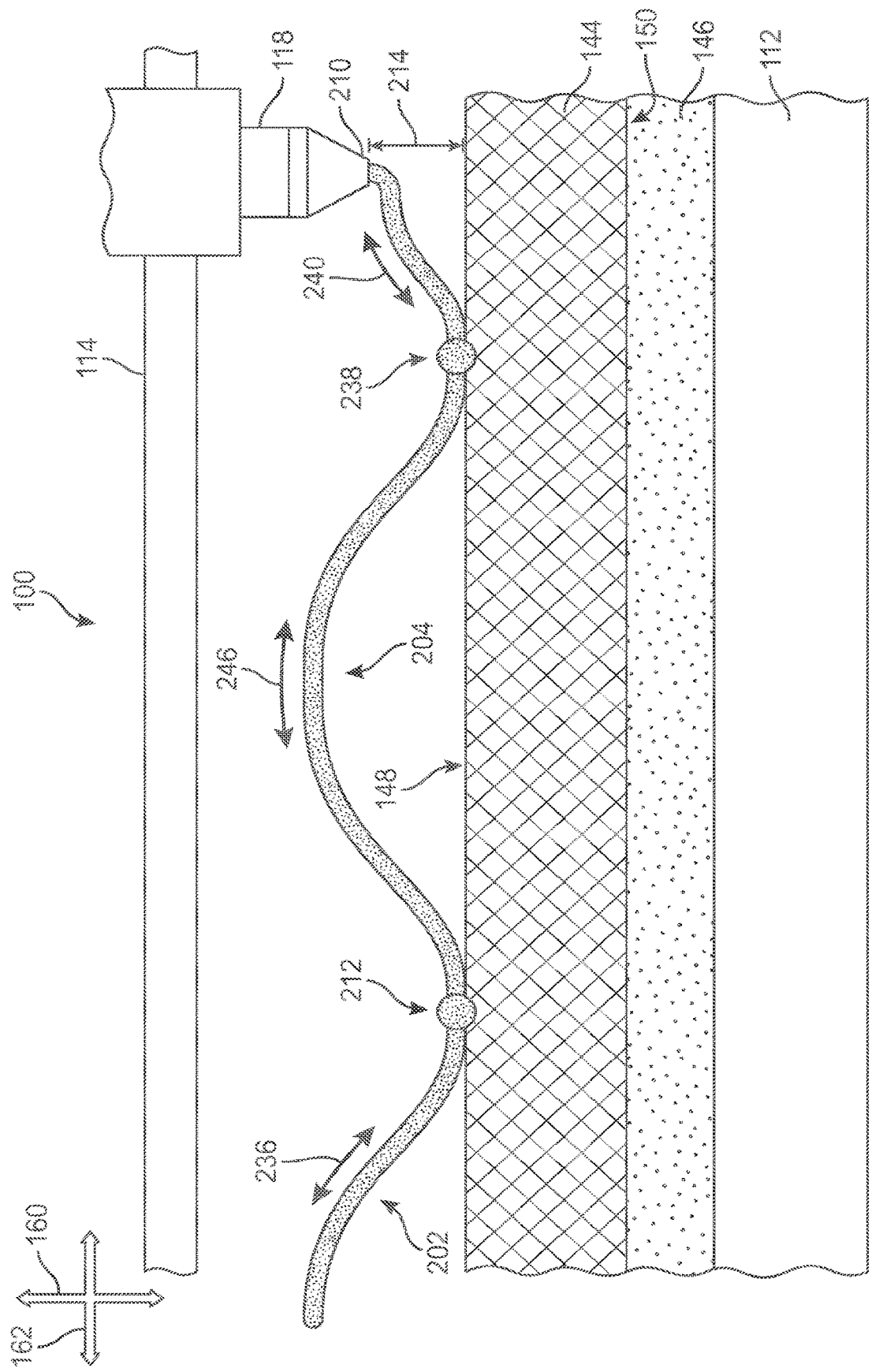
FIG. 18 is a schematic view of the attachment region of FIG. 4 separating tensions of a yarn and the attachment region of FIG. 15 separating tensions of the yarn, in accordance with an exemplary embodiment.

In some embodiments, an attachment region may separate different tension regions of the yarn. As illustrated in FIG. 18, attachment region 212 may separate tag tension 236 and relaxed tension 246. In the example, attachment region 238 may separate relaxed tension 246 and the tension 240. In other embodiments, different attachments of the yarn separate identical tension regions of the yarn.

Figure 19:
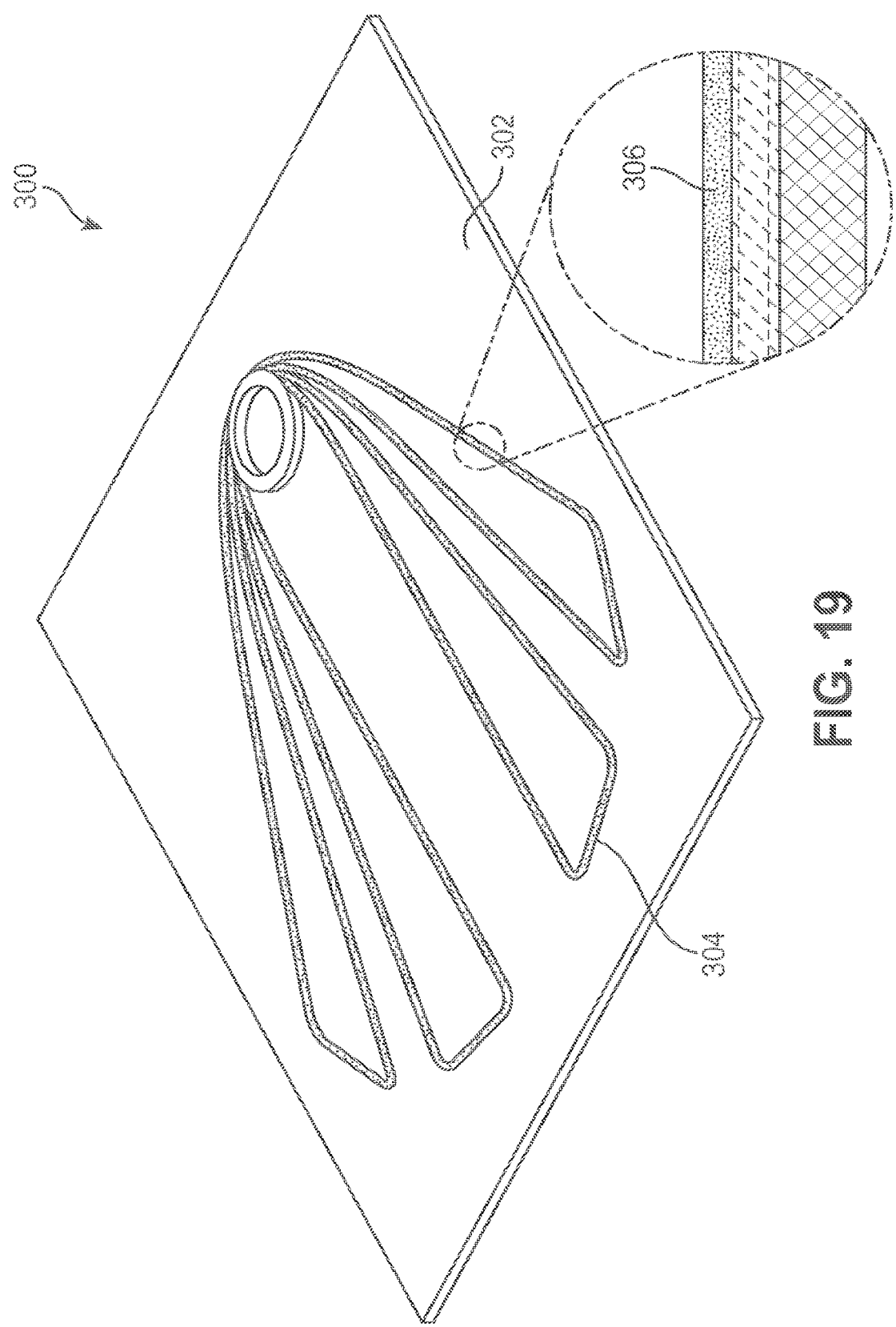
FIG. 19 is a schematic view of a fastener system in an attached state, in accordance with an exemplary embodiment.
Figure 20:
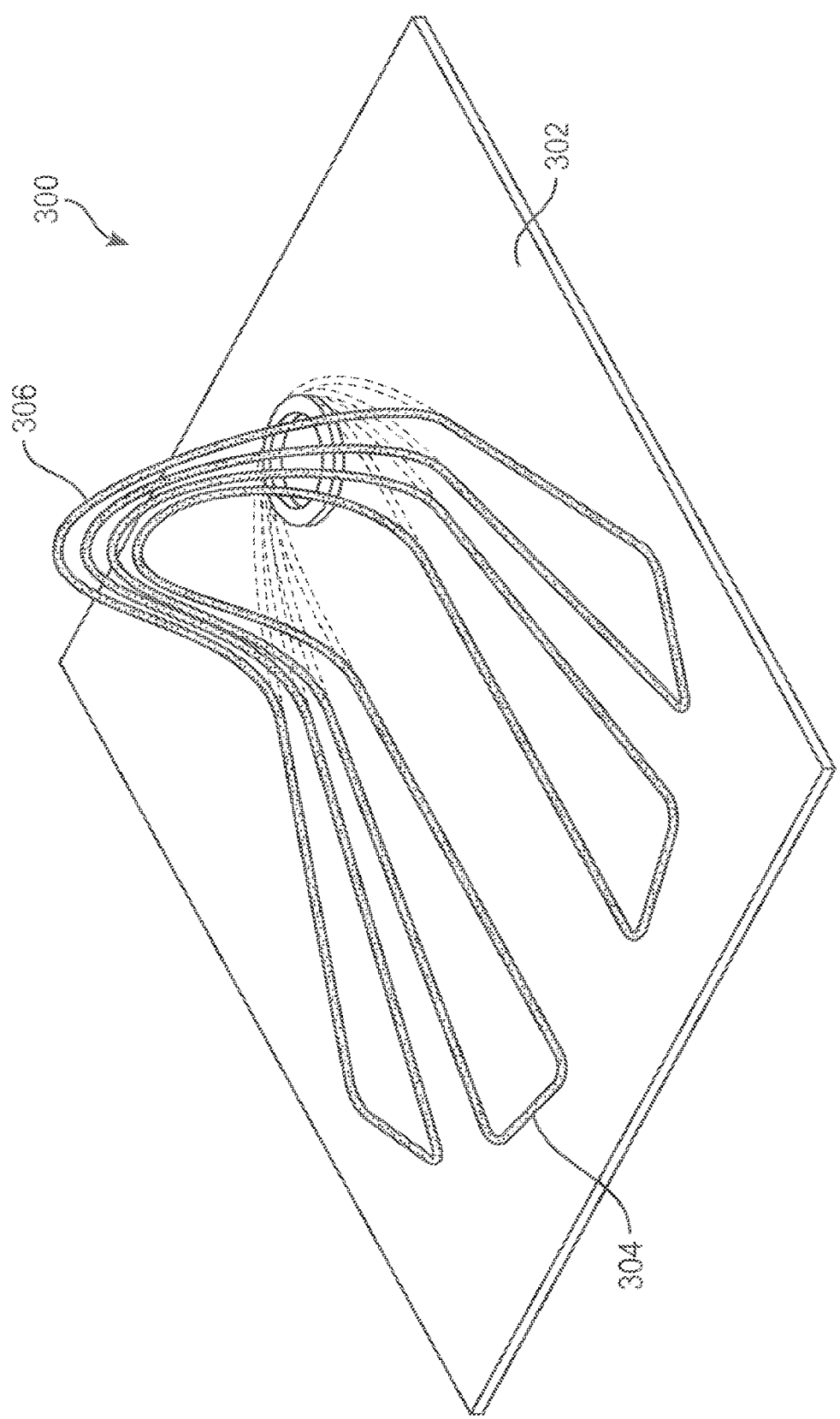
FIG. 20 is a schematic view of the fastener system of FIG. 19 in a detached state, in accordance with an exemplary embodiment.

FIGS. 19-20 illustrate an exemplary article manufactured by one or more steps of the various embodiments. As shown in FIG. 19, fastener system 300 may include base 302. Examples of base 302 include a portion of an article of footwear and apparel. As illustrated in FIG. 19, base 302 may include yarn structure 304. As previously noted, the various embodiments allow for melt resistant materials, such as textile fibers. As shown, textile fibers 306 may be attached to base 302. In the example, fastener 310 may be attached to base 302. Further, in the example, textile fibers 306 may be releasably attached to fastener 310 by looping textile fibers 306 around fastener 310. As illustrate in FIG. 20, textile fibers 306 may be removed by unlooping textile fibers 306 from fastener 310.

Figure 21:
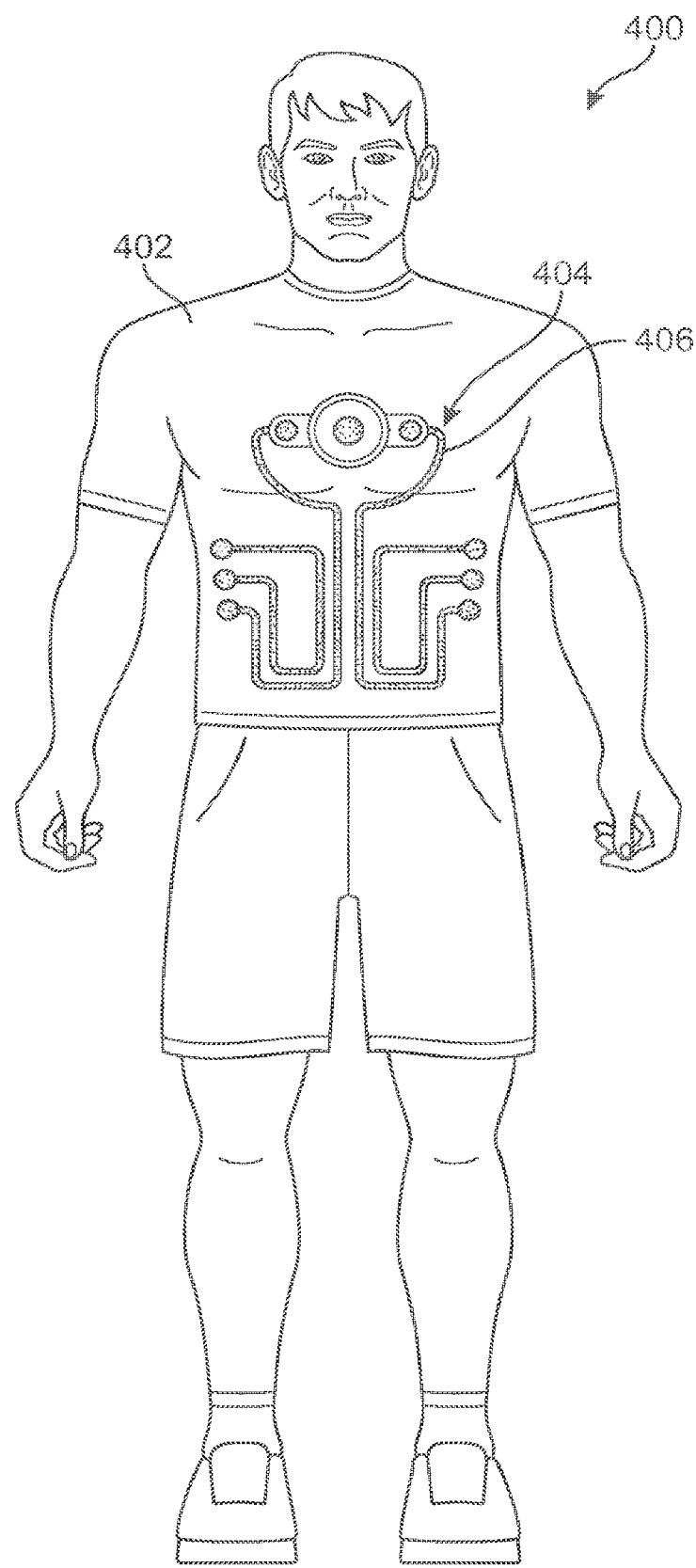
FIG. 21 is a schematic view of a wearable circuit, in accordance with an exemplary embodiment.

FIG. 21 illustrates another exemplary article manufactured by one or more steps of the various embodiments. As illustrated in FIG. 21, wearable circuit 400 may include base 402. In the example, base 402 may be, for example, a shirt. In other examples, base 402 may be any type of the apparel.

Examples of apparel may include hats, pants, and the like. Moreover, in other examples, base 402 may be a portion of a footwear (e.g., shoes), an accessory item (e.g., backpack), and the like. As shown, base 402 may include yarn structure 404. As previously noted, the various embodiments allow for melt resistant materials, such as a conductive metal. As shown in FIG. 21, copper conductor 406 may be attached to base 402. As such, wearable circuit 400 may allow for circuitry to facilitate a use of electrical devices. For example, wearable circuit 400 may allow a heart rate monitor sensor to be incorporated into a shirt design.

Figure 22:
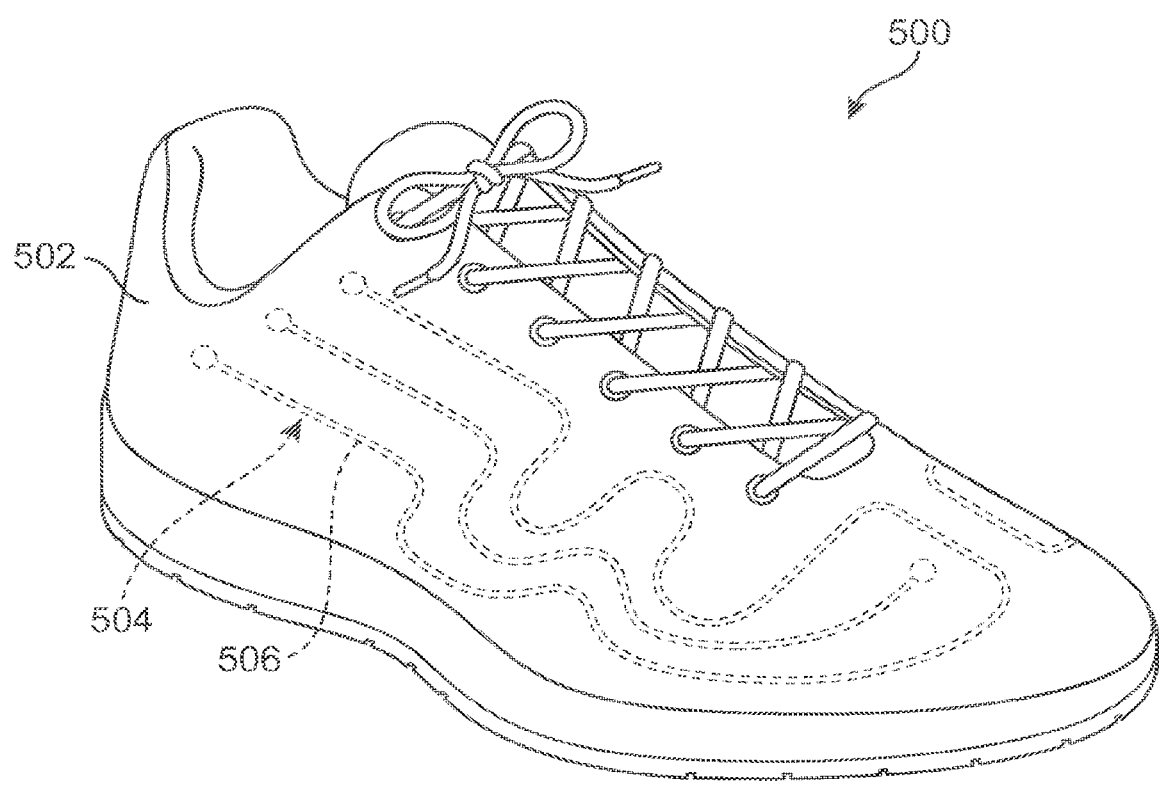
FIG. 22 is a schematic view of an article having a tensile element, in accordance with an exemplary embodiment.

FIG. 22 illustrates yet another exemplary article manufactured by one or more steps of the various embodiments. As illustrated in FIG. 22, article 500 includes base 502. Examples of base 502 may include a shoe, shirts, hats, and pants. Moreover, in other examples, the base 502 may be any type of consumer product, for example, an accessory item (e.g., backpack). As shown, base 502 may include yarn structure 504. As previously noted, the various embodiments allow for melt resistant materials, such as a tensile element formed of a carbon fiber. As shown, carbon fiber 506 may be attached to base 502. Such an inclusion of carbon fiber 506 in article 500 may allow for improved performance of article 500. For example, article 500 may have an increased arch support.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substitute for any other feature or element in any other embodiment unless specifically restricted. Accordingly, the embodiments are not to be restricted except in light of the attached claims and their equivalents. Also, various modifications and changes may be made within the scope of the attached claims.

We claim:

1. A method of bonding a yarn to a wearable article at a plurality of bonding locations, comprising:
    disposing a first portion of a yarn at a first bonding location;
    bonding the first portion of the yarn at the first bonding location;
    disposing a second portion of a yarn at a second bonding location; and
    bonding the second portion of the yarn at the second bonding location,
    wherein the first bonding location comprises a first portion of the wearable article and the second bonding location comprises a second portion of the wearable article;
    the first bonding location and the second bonding location are spaced apart from one another on a surface of the wearable article;
    an intermediate portion of the yarn extends contiguously between the first bonding location and the second bonding location;
    the intermediate portion of the yarn is not bonded to the wearable article; and
    the bonding comprises disposing a softened thermoplastic material and the yarn in contact with one another and then allowing the thermoplastic material to harden, anchoring the yarn in position.

2. The method of claim 1, further comprising:
    dispensing the yarn and the softened thermoplastic material simultaneously through a nozzle system of a printing system.

3. The method of claim 2, wherein after bonding the yarn at the first bonding location, the nozzle system is moved away from the surface of the wearable article at the first bonding location and towards the surface of the wearable article at the second bonding location.

4. The method of claim 2, wherein the nozzle system comprises a first nozzle through which the yarn and the softened thermoplastic material are dispensed.

5. The method of claim 1, wherein the thermoplastic material is a heat moldable material.

6. The method of claim 1, wherein the yarn comprises a textile.

7. The method of claim 1, wherein the yarn comprises a plant material.

8. The method of claim 1, wherein the yarn comprises an animal material.

9. The method of claim 1, wherein the yarn and the softened thermoplastic material are dispensed from a material source that comprises a reel of the yarn and the softened thermoplastic material.

10. The method of claim 3, wherein moving the nozzle system away from the first bonding location to the second bonding location comprises moving the nozzle system parallel to the surface of the wearable article.

11. The method of claim 3, wherein the yarn and the softened thermoplastic material are ejected from an outflow opening of the nozzle system.

12. The method of claim 3, wherein moving the nozzle system away from the first bonding location after attaching and bonding the first portion to the yarn to the first bonding location pulls the yarn and the softened thermoplastic material out of an outflow opening of the nozzle system.

13. The method of claim 1, wherein the wearable article is an article of apparel.

14. The method of claim 1, wherein the wearable article is an article of footwear.

15. A wearable article comprising:
    a surface of the wearable article;
    a yarn bonded to the surface at a plurality of bonding locations;
    a first bonding location on the surface of the wearable article at which a first portion of the yarn is bonded to the surface of the wearable article;
    a second bonding location on the surface of the wearable article at which a second portion of the yarn is bonded to the surface of the wearable article, the first bonding location and the second bonding locations being spaced apart from one another; and
    an intermediate portion of the yarn that extends contiguously between the first bonding location and the second bonding location,
    wherein the intermediate portion of the yarn is not bonded to the wearable article, and
    wherein the yarn is bonded to the surface of the wearable article by a hardened thermoplastic material in contact with the yarn at the first bonding location and the second bonding location.

16. The wearable article of claim 15, wherein the thermoplastic material is a heat moldable material.

17. The wearable article of claim 15, wherein the yarn comprises a textile.

18. The wearable article of claim 15, wherein the yarn comprises a plant or animal material.

19. The wearable article claim 15, wherein the wearable article is an article of apparel.

20. The wearable article of claim 15, wherein the wearable article is an article of footwear.

\* \* \* \* \*